United States Patent
Chen et al.

(10) Patent No.: US 12,236,462 B2
(45) Date of Patent: Feb. 25, 2025

(54) METHOD, SYSTEM, AND COMPUTER-READABLE MEDIA FOR MESSAGE EXCHANGE BASED ON BIDS, QUALITY SCORES, AND COST

(71) Applicant: Twilio Inc., San Francisco, CA (US)

(72) Inventors: Chloe Chen, San Carlos, CA (US); Simon Khalaf, San Francisco, CA (US); Jamie O'Shaughnessy, Surrey (GB)

(73) Assignee: Twilio, Inc., San Francisco, CA (US)

( * ) Notice: Subject to any disclaimer, the term of this patent is extended or adjusted under 35 U.S.C. 154(b) by 430 days.

(21) Appl. No.: 17/061,810

(22) Filed: Oct. 2, 2020

(65) Prior Publication Data
US 2021/0264489 A1    Aug. 26, 2021

Related U.S. Application Data

(60) Provisional application No. 62/980,629, filed on Feb. 24, 2020.

(51) Int. Cl.
G06Q 30/06      (2023.01)
G06Q 30/0601    (2023.01)

(52) U.S. Cl.
CPC ................ *G06Q 30/0611* (2013.01)

(58) Field of Classification Search
CPC .......................... G06Q 30/06; G06Q 30/0611
See application file for complete search history.

(56) References Cited

U.S. PATENT DOCUMENTS 6,134,589 A * 10/2000 Hultgren ................ H04L 45/00
                                                     709/227
6,487,172 B1 * 11/2002 Zonoun .................. H04L 45/04
                                                     370/449

(Continued)

FOREIGN PATENT DOCUMENTS

EP         3334214        6/2018
IN      202217034647     10/2022

(Continued)

OTHER PUBLICATIONS

Boehm, D. W. (2002). An investigation of negotiations of quality of service parameters in a connection oriented telecommunications network environment (Order No. 3066272). Available from ProQuest Dissertations and Theses Professional. (276326270).*

(Continued)

*Primary Examiner* — Jeffrey A. Smith
*Assistant Examiner* — Jennifer V Lee
(74) *Attorney, Agent, or Firm* — LOWENSTEIN SANDLER LLP

(57) ABSTRACT

Disclosed are systems, methods, and non-transitory computer-readable media for selecting a routing provider that is best suited to deliver each individual message. The message exchange system selects a routing provider based on customer criteria provided by the customer, bids provided by the routing providers and/or performance of the routing providers. The message exchange system ranks the bids based on a ranking value calculated for each bid based on the cost value associated with the bid, the quality score of the associated routing provider and the customer criteria. The message exchange system selects a bid based on the resulting ranking values. For example, the message exchange system selects the bid that is ranked the highest based on the ranking values. The message exchange system then trans- (Continued)

mits the message to its intended recipient via the routing provider associated with the selected bid.

22 Claims, 11 Drawing Sheets

(56) References Cited

U.S. PATENT DOCUMENTS

| | | | |
|---|---|---|---|
| 8,355,316 | B1 | 1/2013 | Lushear et al. |
| 9,467,970 | B1 | 10/2016 | Kim et al. |
| 10,939,256 | B1 | 3/2021 | Shcherbakov et al. |
| 11,290,352 | B2 | 3/2022 | O'Shaughnessy et al. |
| 2002/0177448 | A1* | 11/2002 | Moran .................. H04L 43/50 455/466 |
| 2003/0088529 | A1 | 5/2003 | Klinker et al. |
| 2009/0003269 | A1 | 1/2009 | Kumazawa et al. |
| 2010/0228641 | A1* | 9/2010 | Das .................. G06Q 30/0275 705/26.1 |
| 2011/0166958 | A1 | 7/2011 | Hamilton, II et al. |
| 2013/0022186 | A1 | 1/2013 | Blackwell et al. |
| 2014/0031070 | A1 | 1/2014 | Nowack et al. |
| 2015/0131444 | A1 | 5/2015 | Malatack et al. |
| 2015/0381648 | A1 | 12/2015 | Mathis |
| 2015/0382263 | A1 | 12/2015 | Jain et al. |
| 2017/0041213 | A1 | 2/2017 | Nadalin et al. |
| 2018/0219818 | A1 | 8/2018 | Kramer et al. |
| 2020/0252343 | A1 | 8/2020 | Popescu et al. |
| 2021/0344575 | A1 | 11/2021 | O'Shaughnessy et al. |
| 2022/0158911 | A1 | 5/2022 | O'Shaughnessy et al. |
| 2023/0254224 | A1 | 8/2023 | Jamie |

FOREIGN PATENT DOCUMENTS

| | | |
|---|---|---|
| IN | 202217035888 | 11/2022 |
| JP | 2006197306 A | 7/2006 |
| WO | 9428683 | 12/1994 |
| WO | 9711553 | 3/1997 |
| WO | 03040947 A9 | 4/2004 |
| WO | 2006069039 | 6/2006 |
| WO | 2012006659 A1 | 1/2012 |
| WO | 2021173655 | 9/2021 |
| WO | 2021222914 | 11/2021 |

OTHER PUBLICATIONS

Ng, C. Y. (2010). Resource allocation for cooperative transmission in wireless network (Order No. 3484726). Available from ProQuest Dissertations and Theses Professional. (906719527). Retrieved from https://dialog.proquest.com/professional/docview/906719527?accountid=131444.*

"International Application Serial No. PCT/US2021/019396, International Search Report mailed Jun. 9, 2021", 5 pgs.

"International Application Serial No. PCT/US2021/019396, Written Opinion mailed Jun. 9, 2021", 8 pgs.

"International Application Serial No. PCT US2021 070269, International Preliminary Report on Patentability mailed Jul. 5, 2022", 7 pgs.

"International Application Serial No. PCT US2021 070269, International Preliminary Report on Patentability mailed Aug. 16, 2022", 9 pgs.

"International Application Serial No. PCT US2021 019396, International Preliminary Report on Patentability mailed Sep. 9, 2022", 10 pgs.

"U.S. Appl. No. 17/649,984, Non Final Office Action mailed Sep. 26, 2022", 17 pgs.

"International Application Serial No. PCT US2021 070269, International Search Report mailed Jul. 1, 2021", 4 pgs.

"International Application Serial No. PCT US2021 070269, Written Opinion mailed Jul. 1, 2021", 6 pgs.

"U.S. Appl. No. 17/130,831, Non Final Office Action mailed Aug. 19, 2021", 18 pgs.

"U.S. Appl. No. 17/130,831, Examiner Interview Summary mailed Oct. 7, 2021", 1 pg.

"U.S. Appl. No. 17/130,831, Response filed Nov. 11, 2021 to Non Final Office Action mailed Aug. 19, 2021", 15 pgs.

"U.S. Appl. No. 17/130,831, Notice of Allowance mailed Nov. 24, 2021", 10 pgs.

European Application Serial No. 21/720,150_8, Response to Communication Pursuant to Rules 161 and 162 EPC filed Jan. 31, 2023, 12 pgs.

Indian Application Serial No. 202217034647, Response filed Feb. 24, 2023 to First Examination Report mailed Nov. 9, 2022, w English claims, 20 pgs.

Japanese Application Serial No. 2022-565738, Voluntary Amendment filed Mar. 29, 2023, w English claims, 13 pgs.

Japanese Application Serial No. 2022-565738, Office Action issued on Aug. 22, 2023, w English translation, 6 pages.

USPTO, U.S. Appl. No. 17/649,984, Corrected Notice of Allowability mailed May 15, 2023.

U.S. Appl. No. 17/649,984, filed Feb. 4, 2022, Message Routing Optimization System.

Non-Final Office Action for U.S. Appl. No. 18/134,837, mailed Dec. 1, 2023, 19 Pages.

Office Action for Australian Patent Application No. 2021225837, mailed Oct. 17, 2023, 4 Pages.

Office Action for Australian Patent Application No. 2021263605, mailed Nov. 23, 2023, 3 Pages.

Office Action for Korean Patent Application No. 20227022489, mailed Oct. 26, 2023, 9 Pages.

"Korean Application Serial No. 10-2022-7022489, Office Action mailed Sep. 27, 2022", With English machine translation, 5 pgs.

"Indian Application Serial No. 202217034647, First Examination Report mailed Nov. 9, 2022", With English translation, 7 pgs.

"U.S. Appl. No. 17/649,984, Response filed Dec. 20, 2022 to Non Final Office Action mailed Sep. 26, 2022", 8 pgs.

"European Application Serial No. 21713208.3, Response to Communication Pursuant to Rules 161 and 162 EPC filed Sep. 16, 2022", 16 pgs.

"U.S. Appl. No. 17/649,984, Notice of Allowance mailed Jan. 17, 2023", 9 pgs.

"Indian Application Serial No. 202217035888, Office Action mailed Jan. 17, 2023", 6 pgs.

* cited by examiner

METHOD, SYSTEM, AND COMPUTER-READABLE MEDIA FOR MESSAGE EXCHANGE BASED ON BIDS, QUALITY SCORES, AND COST

CROSS-REFERENCE TO RELATED APPLICATIONS

This application claims the benefit of priority of U.S. Provisional Application No. 62/980,629, filed on Feb. 24, 2020, which is incorporated herein by reference in its entirety.

TECHNICAL FIELD

An embodiment of the present subject matter relates generally to communications and, more specifically, to a message exchange system.

BACKGROUND

Routing providers provide message delivery functionality to customers. For example, routing providers charge customers a fee for each message delivered by the routing provider to an intended recipient. Customers may select which routing provider to use based on the price and/or performance offered by the routing providers. That is, a customer may enter into a contractual agreement with a routing provider for a fixed period of time during which the routing provider provides routing services for the customer.

Currently, customers engage with routing providers prior to a routing provider providing routing services for the customer. For example, a customer may gather quotes and information from multiple routing providers and then select a routing provider that best fits the customer's needs. Similarly, routing providers may provide customers a bid based on project parameters provided by the customer during the selection process.

Once a selection has been made and a customer enters into a contractual relationship with a routing provider, the customer uses the selected routing provider until the contract is terminated by either party of the term of the contract expires. As a result, both the customer and the selected routing provider are bound by the contractual agreement without the ability to adjust the bid and/or service criteria.

This is problematic as different routing providers may become better suited a customer's needs over time. For example, the customer's needs or priorities may change over time, such as the customer placing a higher value on the quality of service provided rather than the price, or vice versa. As another example, the geographic jurisdictions in which the customer operates may also change, making a different routing provider a better fit for the customer. Similarly, the performance and/or bid prices offered by the routing providers may also change, making a different routing provider a better fit for the customer. Accordingly, improvements are needed.

SUMMARY

A message exchange system selects a routing provider that is best suited to deliver each individual message for customers of the message exchange system (e.g., online services, retailer, banks, etc.). For example, the message exchange system selects a routing provider based on customer criteria provided by the customer, bids provided by the routing providers and/or quality scores describing performance of the routing providers. Selecting a routing provider per message provides customers with the ability utilize the services of multiple routing providers based on the current needs of the customer and performance/offering of the routing providers. For example, the message exchange system may select the routing provider that provides the best combination of quality of service and/or price given the customer's specific needs. The message exchange system also provides routing providers with an opportunity to deliver message for a larger number of customers by modifying their bid prices and/or quality of service to meet customer needs. For example, a routing provider may lower their bid prices and/or increase their quality of service in an effort to increase their chances of being selected to deliver messages.

The message exchange system provides a customer management tool that allows customers to manage their customer criteria. The customer criteria includes data describing the customer's preferences for message delivery. For example, the customer criteria may indicate a minimum level of service (e.g., deliverability, latency, etc.), maximum cost value to deliver a message, preference between cost and quality, etc. The customer management tool provides an interface that enables customers to provide and/or modify their customer criteria.

Similarly, the message exchange system provides a routing provider management tool that allows routing providers to provide and/or modify bids for delivering messages. For example, the bids may include a cost value indicating a monetary value (e.g., minimum monetary value) at which the routing provider is willing to deliver messages, geographic jurisdictions in which the routing provider provides message delivery, etc.

The message exchange system maintains a quality index that describes the quality of service provided by each routing provider. For example, the quality index includes individual quality scores determined for each routing provider. Each quality score may indicate the estimated likelihood that a message transmitted by the routing provider or specific route provide by the routing provider will successfully be delivered to its intended recipient. The message exchange system calculates each quality score based on feedback data and/or performance testing data for each routing provider. The feedback data is data describing the routing providers actual performance delivering messages that have been allocated to the routing provider for delivery. For example, the feedback data included data describing whether the routing provider transmitted the messages to their intended recipients, whether the messages were successfully received by their intended recipients, whether the messages resulted in a specified action by the recipients, an amount of time that elapsed until the messages were transmitted by the routing provider, an amount of time that elapsed until the messages were received by the recipients, etc.

The performance testing data describes the tested performance of the routing providers. For example, tests of the routing provider networks are conducted during which test messages and/or synthetic messages are transmitted using routes provided by the routing provider. The performance testing data describes the tracked performance of the test messages, such as whether the test messages were transmitted, received and/or resulted in a specified response, as well as the elapsed time for the test messages to be transmitted and/or received.

The message exchange system calculates a quality score for each routing provider based on the feedback data and/or performance testing data for the routing provider. The resulting quality scores indicate the performance level of the routing provider such as by indicating the likelihood that a message transmitted by the routing provider or specific route of the routing provider will be received by its intended recipient. The message exchange system may update the quality scores in the quality index periodically to reflect the current performance of each routing provider or offered route.

When the message exchange system receives a request from a customer to deliver a message, the message exchange system initially gathers the customer criteria corresponding to the customer and uses the gathered customer criteria to enrich the received request. For example, the message exchange system appends the customer criteria to the request, resulting in an enriched request. The message exchange system provides the enriched request to an auction engine, which uses the customer criteria along with the bids and quality index to rank the bids based on the specific needs of the customer. The message exchange system may calculate a ranking value for each bid based on the cost value associated with the bid, the quality score of the associated routing provider and the customer criteria. For example, the message exchange system may apply different weights to the quality score and/or cost value based on the customer criteria and then calculate the ranking value based on the weighted quality score and/or cost value. As a result, the quality scores will have a greater impact on the resulting ranking values for a customer that places a higher value on quality of service, while the cost value will have a greater impact on the resulting ranking values for a customers that place a higher value on cost. Accordingly, the ranking values for the bids will vary based on the preferences of the customers.

The message exchange system selects a bid based on the resulting ranking values. For example, the message exchange system selects the bid that is ranked the highest based on the ranking values. The message exchange system may also select a final price at which to charge for delivering the message, such as the cost value associated with the selected bid or a cost value associated with a second ranked bid. The message exchange system then transmits the message to its intended recipient via the routing provider associate with the selected bid.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for selecting a routing provider to deliver a message based on customer criteria. A message exchange system selects the routing provider based on customer criteria provided by the customer, bids provided by the routing providers and/or quality scores indicating the quality of service provided by the routing providers. Selecting a routing provider per message provides customers with the ability to use multiple routing providers and have their messages delivered by the routing provider that is best suited to deliver the specific message. For example, the message exchange system may select the routing provider that provides the best combination of quality and/or price given the customer's specific needs. The message exchange system also provides routing providers with an opportunity to increase the number of messages they deliver by modifying their bid price and/or quality of service to meet the current needs of the customers. For example, a routing provider may lower their bid prices and/or increase their quality of service in an effort to increase their chances of being selected to deliver messages.

Figure 1:
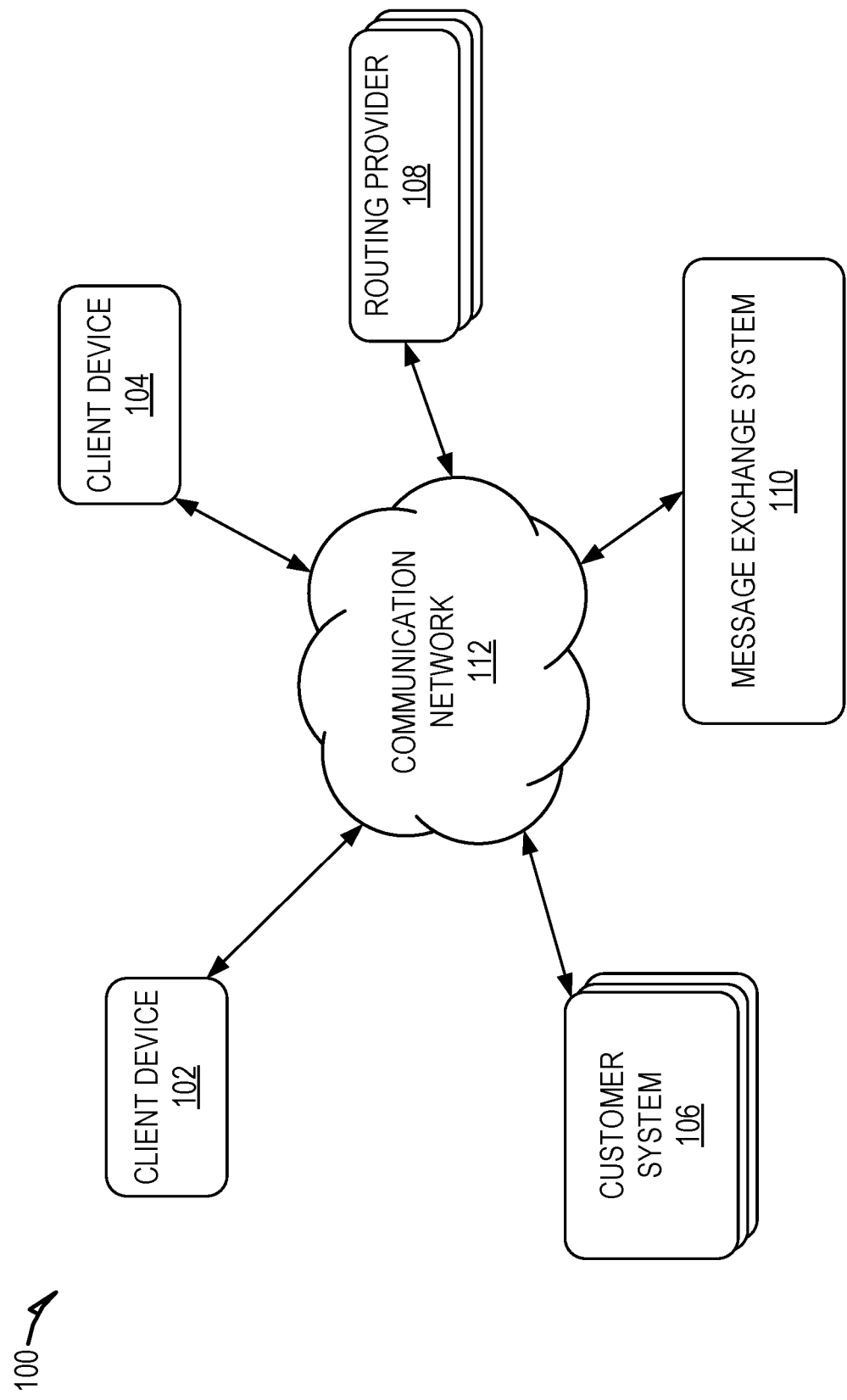
FIG. 1 shows an example system for selecting a routing provider to deliver a message based on customer criteria, according to some example embodiments.

FIG. 1 shows an example system 100 for selecting a routing provider to deliver a message based on customer criteria, according to some example embodiments. As shown, multiple devices (i.e., client device 102, client device 104, customer system 106, routing provider 108 and message exchange system 110) are connected to a communication network 112 and configured to communicate with each other through use of the communication network 112. The communication network 112 is any type of network, including a local area network (LAN), such as an intranet, a wide area network (WAN), such as the internet, a telephone and mobile device network, such as cellular network, or any combination thereof. Further, the communication network 112 may be a public network, a private network, or a combination thereof. The communication network 112 is implemented using any number of communication links associated with one or more service providers, including one or more wired communication links, one or more wireless communication links, or any combination thereof. Additionally, the communication network 112 is configured to support the transmission of data formatted using any number of protocols.

Multiple computing devices can be connected to the communication network 112. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1100 shown in FIG. 11.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users may interact with a customer system 106 to utilize online services provided by a customer. Users communicate with and utilize the functionality of the customer system 106 by using the client devices 102 and 104 that are connected to the communication network 112 by direct and/or indirect communication. The customer may provide any type of service, whether it be online or offline, and the customer system 106 may facilitate any related service that is provided online, such as a ride-sharing service, reservation service, retail service, news service, etc.

Although the shown system 100 includes only two client devices 102, 104 and one customer system 106, this is only for ease of explanation and is not meant to be limiting. One skilled in the art would appreciate that the system 100 can include any number of client devices 102, 104 and/or customer systems 106. Further, each customer system 106 may concurrently accept communications from and initiate communication messages and/or interact with any number of client devices 102, 104, and support connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with a customer system 106 via a client-side application installed on the client devices 102 and 104. In some embodiments, the client-side application includes a component specific to the customer system 106. For example, the component may be a stand-alone application, one or more application plug-ins, and/or a browser extension. However, the users may also interact with the customer system 106 via a third-party application, such as a web browser or messaging application, that resides on the client devices 102 and 104 and is configured to communicate with the customer system 106. In either case, the client-side application presents a user interface (UI) for the user to interact with the customer system 106. For example, the user interacts with the customer system 106 via a client-side application integrated with the file system or via a webpage displayed using a web browser application.

A customer system 106 is one or more computing devices associated with a customer to provide functionality of the customer. For example, the customer system 106 may provide an online service. The online service may be any type, such as a banking service, travel service, retail service, etc. The customer system 106, however, does not have to provide an online service that is accessible to users. That is, the customer system 106 may simply be a computing system used by a customer to perform any type of functionality.

A customer may use a customer system 106 to cause transmission of messages, such as short message service (SMS) messages, rich communication service (RCS) messages, and the like. For example, a customer system 106 may provide online functionality that enables users of the customer system 106 to transmit messages to agents of the customer and/or other users. As another example, the customer system 106 may transmits messages users to provide the users with two-factor authentication, password resets, updates, links to content, promotions, etc.

A routing provider 108 provides message delivery functionality, which can be utilized by a customer. For example, a routing provider 108 charges a customer a fee for each message of the customer that is delivered by the routing provider 108. The system 100 may include any number of routing providers 108, customer initially creates a relationship with a routing provider 108 to deliver messages for the customer. For example, a customer may enter into an agreement with a routing provider 108 that provides the best price and/or quality of service based on the needs of the customer. These factors, however, may change over time. For example, the needs of the customer may change and/or the price and quality of service provided by the routing providers 108 may change. This may be problematic as a different routing provider 108 may become a better fit for a customer.

To alleviate this issue, the message exchange system 110 selects a routing provider 108 to deliver each individual message requested by a customer. For example, the message exchange system 110 selects a routing provider 108 based on customer criteria provided by the customer, bids provided by the routing providers 108 and/or performance of the routing providers 108. Selecting a routing provider 108 per message provides customers with the ability to use multiple routing providers 108 and have their messages delivered by the routing provider 108 that is best suited to deliver the specific message. For example, the message exchange system 110 may select the routing provider 108 that provides the best combination of quality of service and/or price given the specific needs of the customer. The message exchange system 110 also provides routing providers 108 with an opportunity to increase the number of messages they deliver for customers by modifying their bid and/or quality of service. For example, a routing provider 108 may lower their bid and/or increase their quality of service in an effort to increase their chances of being selected to deliver messages.

Figure 2:
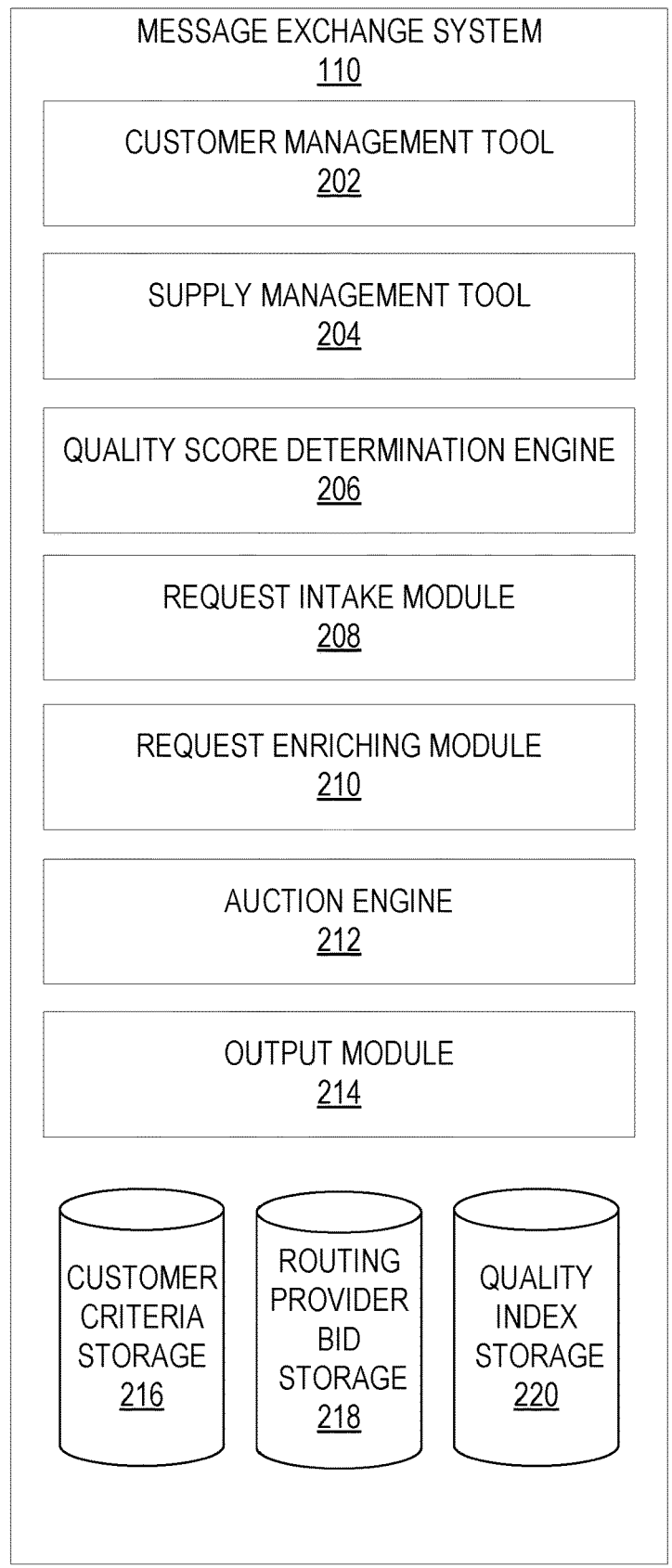
FIG. 2 is a system diagram of a message exchange system, according to some example embodiments.

FIG. 2 is a system diagram of a message exchange system 110, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the message exchange system 110 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the message exchange system 110 includes a customer management tool 202, a supply management tool 204, a quality score determination engine 206, a request intake module 208, a request enriching module 210, an auction engine 212, an output module 214, a customer criteria storage 216, a routing provider bid storage 218, and a quality index storage 220.

The customer management tool 202 enables a customer to manage their customer criteria. For example, the customer management tool 202 provides an interface that enables a customer to establish and modify the customer criteria used by the message exchange system 110 to select routing providers 108 to deliver messages for the customer.

An administrator or other authorized user of the customer may use a client device 102 to communicate with the message exchange system 110 and utilize the functionality provided by the customer management tool 202. For example, the interface provided by the customer management tool 202 may be presented on a display of the client device 102 and used by the administrator or other authorized user to configure the customer criteria for the customer.

The customer criteria may include data describing preferences of the customer for delivery of messages requested by the customer. For example, the customer criteria may indicate a minimum level of service (e.g., deliverability, latency, etc.), maximum cost to deliver a message, preference between cost and quality, etc. The customer criteria may define different criteria based on message type, recipient, geographic region, etc. For example, a customer may wish to place a higher priority on quality of service for certain types of messages, such as marketing messages or two-way messages, and place a higher priority on price for other types of messages, such as password reset messages or reminders. Similarly, a customer may wish to place a higher priority on quality of service for messages transmitted within specified geographic regions, such as geographic regions that have relatively unreliable service, and a higher priority on price for messages transmitted within other specified geographic regions, such as geographic regions that have relatively reliable service.

The customer criteria may also define a allowed list of routing providers from which the message exchange system 110 may select routing providers 108 to deliver messages for the customer. Alternatively, the customer criteria may define a blocked list of routing providers that the message exchange system 110 is not to use when selecting a routing provider 108 to deliver messages for the customer. The blocked list and/or allowed list may be defined per message type, geographic region, etc.

These are just some examples of the customer criteria that may be provided by a customer and is not meant to be limiting. The message exchange system 110 may allow a customer to provide any of a variety of types of customer criteria to dictate selection of a routing provider 108.

The customer management tool 202 stores the provides customer criteria in the customer criteria storage 216, where it may be accesses by other modules of the message exchange system 110. The customer criteria stored in the customer criteria storage 216 may be associated with data identifying the customer that provided the customer criteria. For example, the customer criteria may be associated with a unique identifier allocated to the customer and/or an account of the customer with the message exchange system 110.

The supply management tool 204 enables routing providers 108 to establish and modify bids for delivering messages. For example, the supply management tool 204 provides an interface that allows routing providers 108 to establish and/or modify bids used by the message exchange system 110 when selecting routing providers 108 to deliver messages.

An administrator or other authorized user of a routing provider 108 may use a client device 102 to communicate with the message exchange system 110 and utilize the functionality provided by the supply management tool 204. For example, the interface provided by the supply management tool 204 may be presented on a display of the client device 102 and used by the administrator or other authorized user to provide and/or modify the bid for the routing provider.

A bid provided by a routing provider 108 may include a cost value indicating a monetary value that the routing provider is willing to accept as payment in exchange for delivering a message. For example, the monetary value may indicate the minimum monetary value that routing provider is willing to accept as payment in exchange for delivering a message. The routing provider 108 may provide multiple bids with different cost values based on specified criteria, such as the geographic region in which the message is being delivered, the service level provided by the routing provider 108 to deliver the message, the type of customer, etc. A routing provider 108 may provide various service levels, such as a high service level and a standard service level. The high service level may provide a higher likelihood of a message being successfully received by its recipient and/or a shorter time for the message to be received its recipient than the standard service level. Accordingly, the routing provider 108 may provide a separate bid and associated cost value for delivering a message with each service level. For example, the cost value to deliver a message with the high service level may be higher than the cost value to deliver a message with the standard service level.

As another example, a routing provider 108 may provide separate bids based on geographic region. Accordingly, a routing provider 108 may provide a bid with a lower cost value for a route delivering to a geographic region in which the routing provider 108 delivers a high volume of messages and/or has a lower operating cost. Alternatively, a routing provider 108 may provide a bid with a higher cost value to delivery messages to a geographic region in which the routing provider 108 delivers a low volume of messages and/or has a higher operating cost.

A routing provider 108 may also provide various bids based on the type of customer or specific customer. A routing provider 108 wishing to increase the number of messages they deliver for a specified customer or certain type of customer, such as a customer that delivers a high volume of messages or a customer providing a certain type of service, may provide different bids for the specific customer and/or type of customer. The bid may include a lower cost value than generally offered by the routing provider 108 for a given service level, which may increase the frequency at which the routing provider 108 is selected to deliver messages for the specific customer and/or type of customer. Each bid provided by a routing provider 108 may also define an allowed list and/or blocked list of customers for which the bid may or may not be offered.

These are just some examples of the bids that may be provided by a routing provider 108 and are not meant to be limiting. The message exchange system 110 may allow a routing provider 108 to provide any of a variety of types of bids.

The supply management tool 204 stores the bids in the routing provider bid storage 218, where it may be accesses by other modules of the message exchange system 110. The bids stored in the routing provider bid storage 218 may be associated with data identifying the routing provider 108 that provided the customer criteria. For example, the bids may be associated with a unique identifier allocated to the routing provider 108 and/or an account of the routing provider 108 with the message exchange system 110.

The quality score determination engine 206 generates and maintains a quality index that describes the quality of service provided by each routing provider 108. For example, the quality index includes individual quality scores determined for each routing provider 108, route provided by each routing provider 108, and/or each service level provided by each routing provider 108. The quality score indicates a likelihood that a message delivered using the routing provider 108 and/or specified route will successfully be delivered to its intended recipient.

The quality score determination engine 206 calculates each quality score based on feedback data and/or performance testing data for each routing provider 108. The feedback data is data describing the routing provider's 108 actual performance delivering messages that have been allocated to the routing provider 108 for delivery. For example, the feedback data includes data describing whether the routing provider 108 transmitted the messages to their intended recipients, whether the messages were successfully received by their intended recipients, whether the messages resulted in a specified action by the recipients, an amount of time that elapsed until the messages were transmitted by the routing provider, an amount of time that elapsed until the messages were received by the recipients, etc.

The performance testing data describes the tested performance of the routing providers 108. For example, tests of the routing provider 108 networks are conducted during which test messages are transmitted using routes provided by the routing provider 108. The performance testing data describes the tracked performance of the test messages, such as whether the test messages were transmitted, received and/or resulted in a specified response, the elapsed time for the test messages to be transmitted and/or received, etc.

The quality score determination engine 206 calculates a quality score for each routing provider 108, route provided by each routing provider 108, and/or service level provided by each routing provider 108 based on feedback data and/or performance testing data for the routing provider 108. The resulting quality scores indicate the performance level of the routing provider 108, route or service level, such as the likelihood that the message will be successfully received by its intended recipient.

The quality score determination engine 206 stores the quality index including the individual quality scores in the quality index storage 220. Each quality score may be associated with a unique identifier identifying its corresponding routing provider 108, route and/or service level provided by the routing provider 108. The quality score determination engine 206 may update the quality scores in the quality index periodically to reflect the current performance level of each routing provider 108. The functionality of the quality score determination engine 206 is described in greater detail below in relation to FIG. 6.

The request intake module 208 receives requests to deliver a message for a customer. For example, the request intake module 208 may receive the request from a customer system 106. The request may be transmitted as a result of a user utilizing the online functionality provided by the customer system 106. For example, a user may use a client device 102 to communicate with and utilize the functionality of the customer system 106, which may involve transmission of the message. For example, a user may request to login to an account, resulting in transmission of a message to provide two-factor authentication. As another example, a user may initiate transmitting a message to an agent of the customer or another user. Alternatively, the request may be transmitted by the customer system 106 to provide functionality that is not in direct response to a user use of an online service. For example, the request may be transmitted by the customer system 106 to provide promotional materials or updates to users.

The request may include data identifying the customer, data identifying the intended recipient, and/or a payload of the message. For example, the request may include a unique identifier assigned to the customer and/or the customer's account with the message exchange system 110. The request may also include an identifier for the recipient of the message, such as a phone number associated with a recipient client device 102, an account of the message exchange system 110 associated with the recipient, etc. The payload may include text, image, a rich media format of data and/or any combination of data formats but not limited to the above formats to be included in the message provided to the recipient.

The request enriching module 210 enriches each received request with the appropriate customer criteria. For example, the request enriching module 210 identifies the customer that transmitted the request based on the unique identifier or other data included in the request, and then searches the customer criteria storage 216 for the customer criteria associate with the identified customer. The request enriching module 210 appends at least a portion of the customer criteria to the received request, resulting in an enriched request. For example, the enriched request may be appended with data identify a minimum level of service, a maximum price the customer is willing to be charged per message, an allowed list and/or blocked list of routing providers 108, an importance of cost versus quality of service, etc. The request enriching module 210 may enrich the request with a subset of the customer criteria that is relevant to the message. For example, a customer may define varying customer criteria (e.g., maximum cost, minimum level or service, etc.) based on the type of message (e.g., two communication, password reset, etc.) and/or the geographic region associated with the message. Accordingly, the request enriching module 210 may identify the customer criteria that relates to the message based on the message type and/or geographic region, and then append the identified customer criteria to the request. The request enriching module 210 provides the enriched request to the auction engine 212. The request enriching module 210 may provide the enriched request to the auction engine 212 through use of an Application Programming Interface (API) provided for communication with the auction engine 212. For example, the request enriching module 210 may use an API command defined by the API to transmit the enriched request to the auction engine 212.

The auction engine 212 selects a routing provider 108 to deliver the message based on the customer criteria appended to the enriched message, as well as the bids provided by the routing providers 108 and the quality index. For example, the auction engine 212 communicates with the routing provider bid storage 218 to gather the bids provided by the routing providers 108. The communication between the auction engine 212 and the routing provider bid storage may also be facilitated through use of the API commands. For example, the API provided for communication with the auction engine 212 may include commands to provide bids to the auction engine 212.

The auction engine 212 may gather all bids stored in the routing provider bid storage 218, or a subset of the bids stored in the routing provider bid storage 218. For example, the auction engine 212 may use an allowed list and/or blocked list included in the customer criteria to select a subset of the bids that are eligible for selection. As another example, the auction engine 212 may select a subset of the bids that fall within criteria specified by the customer criteria, such as the bids associated with a cost value within a given range and/or that provide a specified level of service. The auction engine 212 also communicates with the quality index storage 220 to gather the quality scores associated with each gathered bid.

The auction engine 212 ranks each of the bids based on the customer criteria, the quality scores and/or the cost values associated with the bids. For example, the auction engine 212 calculates a ranking value for each bid based on a combination of the customer criteria, the quality scores and/or the cost values associated with the bids and then ranks the bids based on the resulting ranking values.

In some embodiments, the auction engine 212 calculates the ranking value for each bid based on just the quality score associated with the bid and the cost value of the bid. For example, the auction engine 212 may calculate the ranking score by multiplying or computing a function the cost value to the quality score.

In other embodiments, however, the auction engine 212 calculates the ranking value for each bid based on the quality score associated with the bid, the cost value of the bid, and the customer criteria. For example, the auction engine 212 may apply a weight to the quality scores and/or cost values based on the customer criteria and then calculate the ranking values based on the weighted quality scores and/or cost values. The customer criteria may indicate a customer's selected level of importance in relation to the cost and/or level of service provide by a routing provider 108.

The auction engine 212 may apply weights to the quality scores and/or cost values based on the level of importance selected by the customer as indicated in the customer criteria. The auction engine 212 may apply a weight reducing the impact of the quality score when the customer criteria indicates that the cost provided by a routing provider 108 is of greater importance to the customer than the quality of service provided by the routing provider 108. For example, the auction engine 212 may reduce the impact of the quality score by multiplying the quality score by a weight value that is less than 1. Alternatively, the auction engine 212 may apply a weight increasing the impact of the quality score when the customer criteria indicates that the quality of service provided by the routing provider 108 is of greater importance to the customer than the cost provided by the routing provider 108. For example, the auction engine 212 may increase the impact of the quality score by multiplying the cost value by a weight value that is greater than 1.

Similarly, the auction engine 212 may apply a weight reducing the impact of the cost value when the customer criteria indicates that the quality of service provided by a routing provider 108 is of greater importance to the customer than the cost provided by the routing provider 108. For example, the auction engine 212 may reduce the impact of the cost value by multiplying the cost value by a weight value that is less than 1. Alternatively, the auction engine 212 may apply a weight increasing the impact of the cost value when the customer criteria indicates that the cost provided by the routing provider 108 is of greater importance to the customer than the quality of service provided by the routing provider 108. For example, the auction engine 212 may increase the impact of the cost value by multiplying the cost value by a weight value that is greater than 1.

The auction engine 212 may apply a weight to one or both of the cost value and quality score, resulting in a weighted cost value and/or weighted quality score. The auction engine 212 may then calculate the ranking value for each bid based on the weighted cost value and/or weighted quality score. For example, the auction engine 212 may multiply the weighted cost value by the weighted quality score, resulting in the ranking value. As another example, the auction engine 212 may multiply the weighted cost value by the quality score (e.g., quality score without a weight applied), resulting in the ranking value.

The auction engine 212 ranks each of the bids based on the ranking values. For example, the auction engine 212 ranks the bids from the bid with the highest ranking value to the bid with the lowest ranking value, or vice versa. The auction engine 212 then selects a bid based on the resulting ranking. For example, the auction engine 212 selects the bid that is ranked the highest. Alternatively, in some embodiments the auction engine 212 selects a bid that is ranked within a specified range, such as the one of bids that is ranked in the top 5.

The auction engine 212 also selects a final cost value for delivering the message via the selected routing provider. For example, the auction engine 212 may simply select the cost value associated with the selected bid as the final cost value. As a result, the customer will be charged the cost value of the selected bid for delivery of the message. As another example, the auction engine 212 may select the cost value associated with another bid, such as the second highest ranked bid. Accordingly, the customer will be charged the cost value of the second ranked bid for delivery of the message, even though the second bid was not selected for delivering the message.

The auction engine 212 provides data identifying the selected bid to the output module 214. The output module 214 allocates the message for delivery to the routing provider 108 associated with the selected bid. For example, the output module 214 transmits the message to the selected routing provider 108 with instructions to deliver the message to the intended recipient client device 102. The output module 214 may provide the routing provider with data identifying the specific bid selected by the message exchange system 110. This may provide the routing provider 108 with data regarding which route and/or service level to provide for delivering the message.

Figure 3:
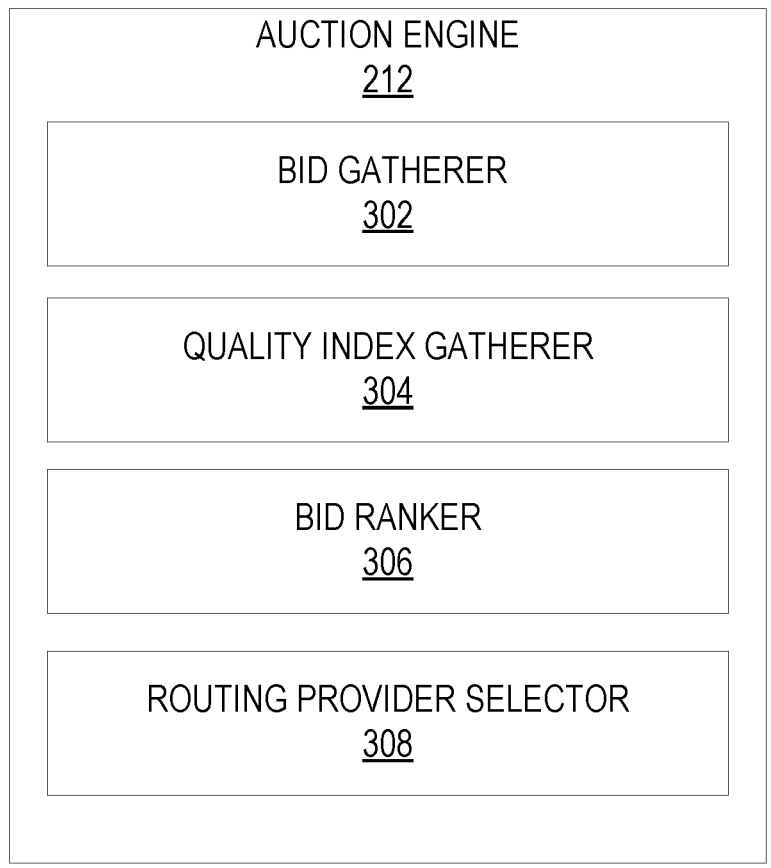
FIG. 3 is a system diagram of an auction engine, according to some example embodiments.

FIG. 3 is a system diagram of an auction engine 212, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the auction engine 212 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the auction engine 212 includes a bid gatherer 302, a quality index gatherer 304, a bid ranker 306, and a routing provider selector 308. The bid gatherer 302 gathers bids provided by the routing providers 108 for a message request. For example, the bid gatherer 302 communicates with the routing provider bid storage 218 to gather the bids provided by the routing providers 108. The bid gatherer 302 may gather all of the bids or a subset of the bids stored in the routing provider bid storage 218. For example, the bid gatherer 302 may use an allowed list and/or blocked list included in the customer criteria to select a subset of the bids that are eligible for selection. As another example, the bid gatherer 302 may select a subset of the bids that fall within criteria specified by the customer criteria, such as the bids associated with a cost value that is below a maximum bid value and/or higher than minimum cost value defined by the customer criteria. As another example, the bid gathered 302 may select a subset of the bids that provide a level of service that is greater than a minimum level or service and/or lower than a maximum level of service defined by the customer criteria.

The bid gatherer 302 may also select a subset of bids based on a geographic region associated with the message request. For example, the recipient of the message may be in a specified geographic region. Accordingly, the bid gatherer 302 may select a subset of the bids that provide delivery in the given geographic region.

The quality index gatherer 304 gathers quality scores for the bids. For example, the quality index gatherer 304 communicates with the quality index storage 220 to gather the quality scores. The quality index gatherer 304 may gather the entire quality index or a subset of the quality scores. For example, the quality index gatherer 304 may gather a subset of the quality scores that correspond to the bids gathered by the bid gatherer 302.

The bid ranker 306 ranks each of the bids based on the customer criteria included in the enriched request, the quality scores gathered by the quality index gatherer 304 and/or the cost values associated with the bids gathered by the bid gatherer 302. The bid ranker 306 calculates a ranking value for each bid based on a combination of the customer criteria, the quality scores and/or the cost values associated with the bids and then ranks the bids based on the resulting ranking values.

In some embodiments, the bid ranker 306 calculates the ranking value for each bid based on only the quality score associated with the bid and the cost value of the bid. For example, the bid ranker 306 may calculate the ranking score by multiplying or computing a function of the cost value and the quality score In other embodiments, however, the bid ranker 306 calculates the ranking value for each bid based on the quality score associated with the bid, the cost value of the bid, and the customer criteria. For example, bid ranker 306 may apply a weight to the quality scores and/or cost values based on the customer criteria and then calculate the ranking values based on the weighted quality scores and/or cost values. The bid ranker 306 may apply a weight to one or both of the cost value and quality score, resulting in a weighted cost value and/or weighted quality score. The bid ranker 306 then calculates the ranking value for each bid based on the weighted cost value and/or weighted quality score. For example, the bid ranker 306 may multiply the weighted cost value by the weighted quality score, resulting in the ranking value. As another example, the bid ranker 306 may multiply the weighted cost value by the quality score (e.g., quality score without a weight applied), resulting in the ranking value.

The bid ranker 306 ranks each of the bids based on the ranking values. For example, the bid ranker 306 ranks the bids from the bid with the highest ranking value to the bid with the lowest ranking value, or vice versa.

The routing provider selector 308 selects a bid for the message based on the ranking generated by the bid ranker 306. For example, the routing provider selector 308 selects the bid that is ranked the highest. The routing provider selector 308 also selects a final cost value for delivering the message via the selected bid. For example, the routing provider selector 308 may select the cost value associated with the selected bid or the cost value associated with another bid, such as the second highest ranked bid. The routing provider selector 308 provides data identifying the selected bid to the output module 214.

Figure 4:
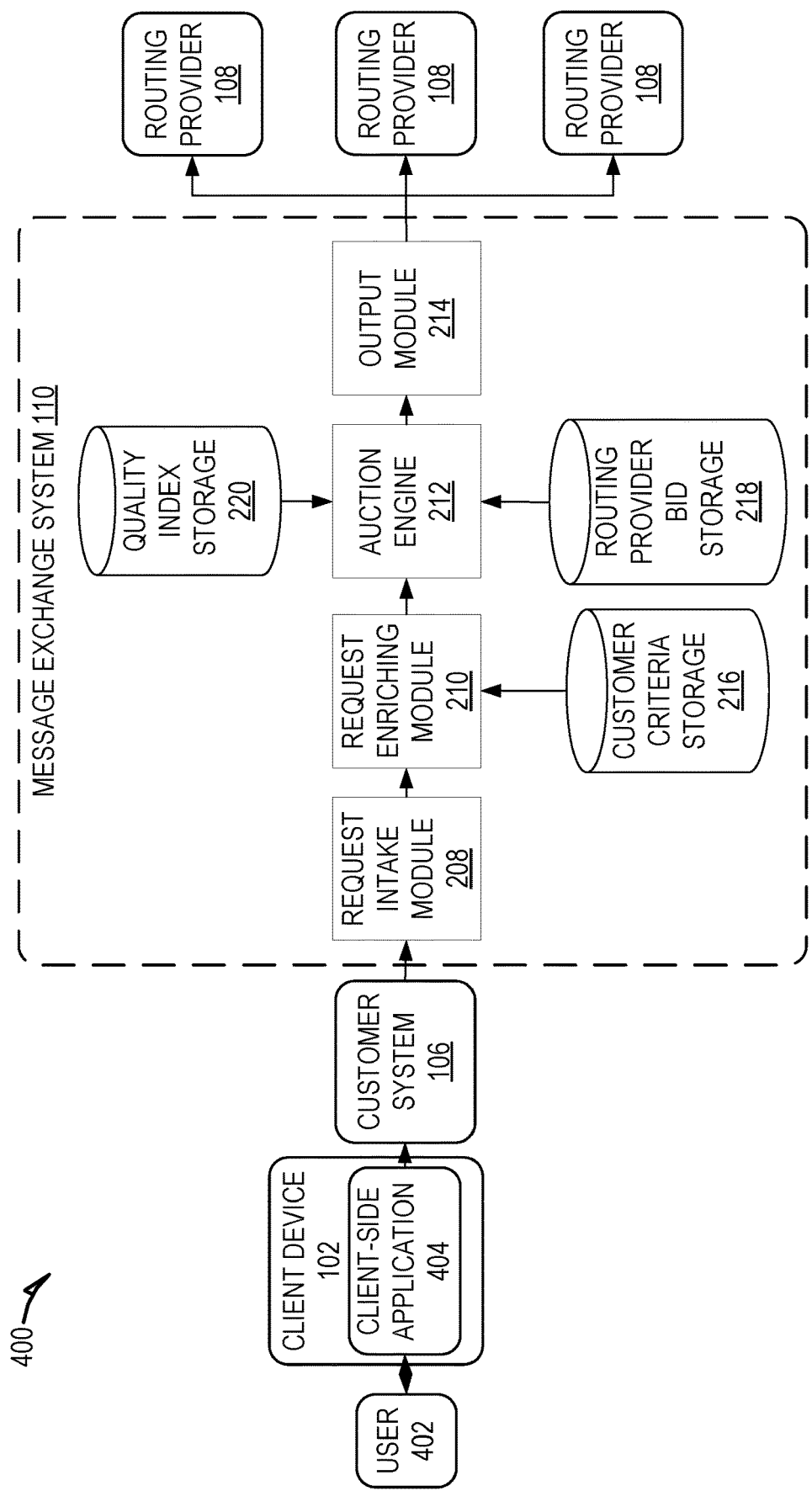
FIG. 4 shows communications within a system for selecting a routing provider to deliver a message based on customer criteria, according to some example embodiments.

FIG. 4 shows communications within a system 400 for selecting a routing provider to deliver a message based on customer criteria, according to some example embodiments. To avoid obscuring the inventive subject matter with unnecessary detail, various functional components (e.g., modules, devices, databases, etc.) that are not germane to conveying an understanding of the inventive subject matter have been omitted from FIG. 4. However, a skilled artisan will readily recognize that various additional functional components may be supported by the system 400 to facilitate additional functionality that is not specifically described herein. Furthermore, the various functional components depicted in FIG. 4 may reside on a single computing device or may be distributed across several computing devices in various arrangements such as those used in cloud-based architectures.

As shown, a user 402 uses a client-side application 404 installed on a client device 102 to utilize the functionality of an customer system 106. The customer system 106 may transmit messages as part of its provided services. For example, the customer system 106 may allow the user 402 to transmit messages to an agent of the customer, transmit messages to other users 402, request a message be transmitted to the client device 102 to provide information, password reset, etc. The customer system 106 may also transmit messages that are not in response to a request made by a user 402. For example, the customer system 106 may transmit messages to provide a user 402 with a notification, marketing materials, etc.

The customer utilizes the functionality of the message exchange system 110 for delivering messages. For example, the message exchange system 110 selects a routing provider 108 to deliver each message based on customer criteria provided by the customer, as well bids provided by the routing providers 108 and a quality index describing the quality of service provided by the routing providers 108. This allows the customer to utilize the routing provider 108 best suited to deliver the message based on the needs of the customer.

The customer system 106 transmits a request to the message exchange system 110 to transmit a message. The request includes data identifying the customer and the recipient of the message. For example, the request may include a unique identifier associated with the customer and/or the customer's account of the message exchange system 110. The request is received by the request intake module 208 of the message exchange system 110.

The request intake module 208 provides the received request to the request enriching module 210, which enriches the request with the customer criteria provided by the customer. The request enriching module 210 uses the unique identifier or other data included in the request to identify the customer that transmitted the request. The request enriching module 210 then communicates with the customer criteria storage 216 to gather the customer criteria associate with the customer.

The request enriching module 210 appends at least a portion of the customer criteria to the received request, resulting in an enriched request. For example, the enriched request may be appended with data identify a minimum level of service, a maximum bid price, an allowed list and/or blocked list of routing providers 108, an importance of cost versus quality of service, etc. The request enriching module 210 provides the enriched request to the auction engine 212.

The auction engine 212 selects a routing provider 108 to deliver the message based on the customer criteria appended to the enriched message, as well as the bids provided by the routing providers 108 and the quality index. For example, the auction engine 212 communicates with the routing provider bid storage 218 to gather the bids provided by the routing providers 108. The auction engine 212 may gather all of the bids or a subset of the bids provided by the routing providers 108. For example, the auction engine 212 may use an allowed list and/or blocked list included in the customer criteria to select a subset of the bids that are eligible for selection. As another example, the auction engine 212 may select a subset of the bids that fall within criteria specified by the customer criteria, such as the bids associated with a cost value within a given range and/or that provide a specified level of service. The auction engine 212 also communicates with the quality index storage 220 to gather the quality scores associated with each gathered bid.

The auction engine 212 ranks each of the bids based on the customer criteria, the quality scores and/or the cost values associated with the bids. For example, the auction engine 212 calculates a ranking value for each bid based on a combination of the customer criteria, the quality scores and/or the cost values associated with the bids and then ranks the bids based on the resulting ranking values.

In some embodiments, the auction engine 212 calculates the ranking value for each bid based on the quality score associated with the bid and the cost value of the bid. For example, the auction engine 212 may calculate the ranking score by multiplying or adding the cost value to the quality score.

In other embodiments, the auction engine 212 calculates the ranking value for each bid based on the quality score associated with the bid, the cost value of the bid, and the customer criteria. For example, the auction engine 212 may apply a weight to the quality scores and/or cost values based on the customer criteria and then calculate the ranking values based on the weighted quality scores and/or cost values. The customer criteria may indicate a level of importance selected by the customer in relation to the cost and/or level of service provide by a routing provider 108.

The auction engine 212 may apply weights to the quality scores and/or cost values based on the level of importance selected by the customer as indicated in the customer criteria. The auction engine 212 may apply a weight reducing the impact of the quality score when the customer criteria indicates that the cost provided by a routing provider 108 is of greater importance to the customer than the level quality provided by the routing provider 108. For example, the auction engine 212 may reduce the impact of the quality score by multiplying the quality score by a weight value that is less than 1. Alternatively, the auction engine 212 may apply a weight increasing the impact of the quality score when the customer criteria indicates that the level of quality provided by the routing provider 108 is of greater importance to the customer than the cost provided by the routing provider 108. For example, the auction engine 212 may increase the impact of the quality score by multiplying the cost value by a weight value that is greater than 1.

Similarly, the auction engine 212 may apply a weight reducing the impact of the cost value when the customer criteria indicates that the level of service provided by a routing provider 108 is of greater importance to the customer than the cost provided by the routing provider 108. For example, the auction engine 212 may reduce the impact of the cost value by multiplying the cost value by a weight value that is less than 1. Alternatively, the auction engine 212 may apply a weight increasing the impact of the cost value when the customer criteria indicates that the cost provided by the routing provider 108 is of greater importance to the customer than the level of service provided by the routing provider 108. For example, the auction engine 212 may increase the impact of the cost value by multiplying the cost value by a weight value that is greater than 1.

The auction engine 212 may apply a weight to one or both of the cost value and quality score, resulting in a weighted cost value and/or weighted quality score. The auction engine 212 may then calculate the ranking value for each bid based on the weighted cost value and/or weighted quality score. For example, the auction engine 212 may multiply the weighted cost value by the weighted quality score, resulting in the ranking value. As another example, the auction engine 212 may multiply the weighted cost value by the quality score (e.g., quality score without a weight applied), resulting in the ranking value.

The auction engine 212 ranks each of the bids based on the ranking values. For example, the auction engine 212 ranks the bids from the bid with the highest ranking value to the bid with the lowest ranking value, or vice versa. The auction engine 212 then selects a bid based on the ranking. For example, the auction engine 212 selects the bid that is ranked the highest.

The auction engine 212 also selects a final cost value for delivering the message via the selected bid. For example, the auction engine 212 may simply select the cost value associated with the selected bid as the final cost value. As a result, the customer will be charged the cost value of the selected bid for delivery of the message. As another example, the auction engine 212 may select the cost value associated with another bid, such as the second highest ranked bid. Accordingly, the customer will be charged the cost value of the second ranked bid for delivery of the message, even though the second bid was not selected by the auction engine 212 for delivering the message.

The auction engine 212 provides data identifying the selected bid to the output module 214. The output module 214 allocates the message to the routing provider 108 associated with the selected bid. For example, the output module 214 transmits the message to the corresponding routing provider 108, which in turn delivers the message to its intended recipient.

Figure 5:
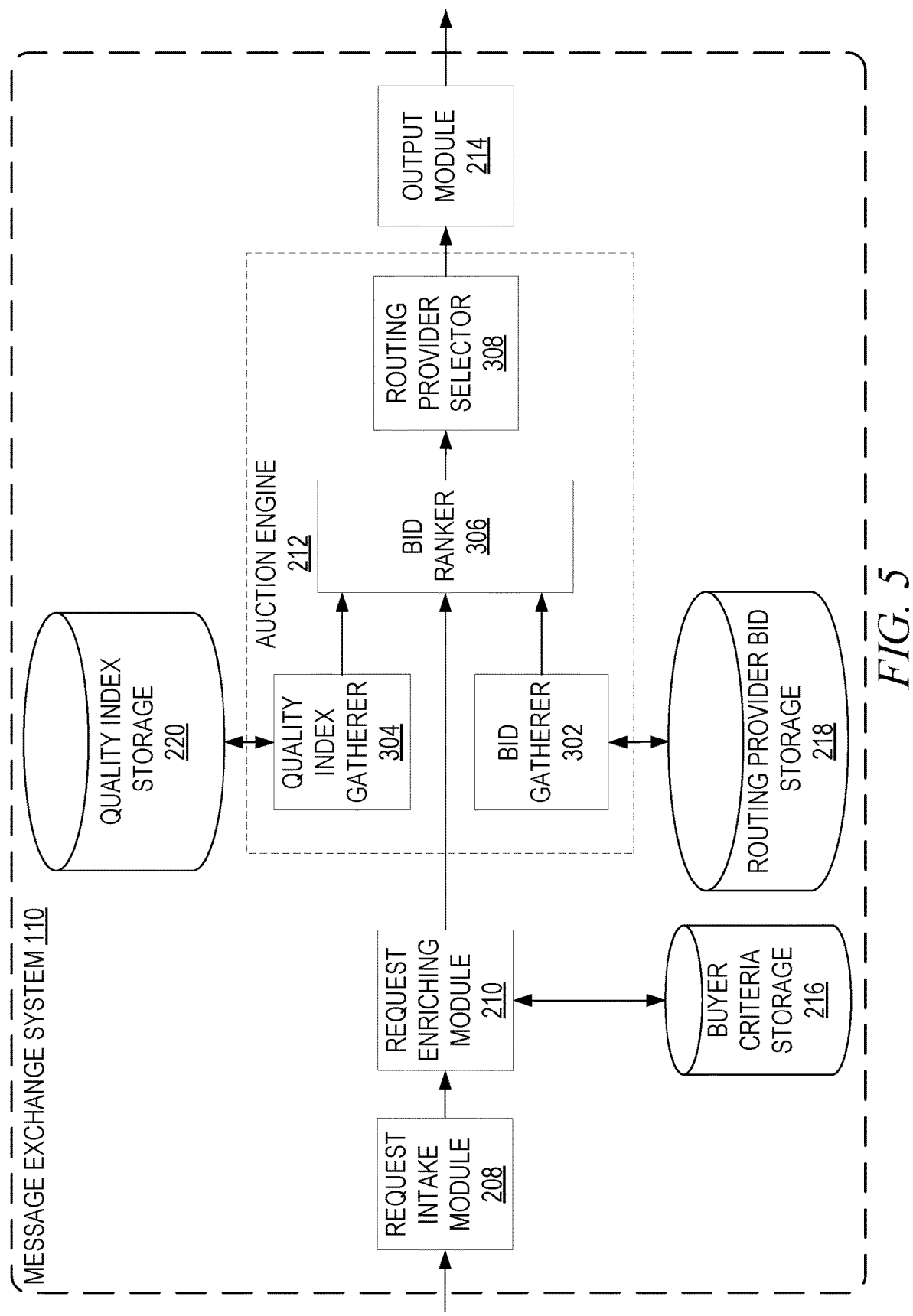
FIG. 5 shows communications within the message exchange system for selecting a routing provider to deliver a message based on customer criteria, according to some example embodiments.

FIG. 5 shows communications within the message exchange system 110 for selecting a routing provider to deliver a message based on customer criteria, according to some example embodiments. To avoid obscuring the inventive subject matter with unnecessary detail, various functional components (e.g., modules, devices, databases, etc.) that are not germane to conveying an understanding of the inventive subject matter have been omitted from FIG. 5. However, a skilled artisan will readily recognize that various additional functional components may be supported by the message exchange system 110 to facilitate additional functionality that is not specifically described herein. Furthermore, the various functional components depicted in FIG. 5 may reside on a single computing device or may be distributed across several computing devices in various arrangements such as those used in cloud-based architectures.

As shown, the request intake module 208 receives a request to deliver a message. For example, the request may be received by a customer system 106 to provide functionality of an online service provided by the customer system 106, transmit marketing messages to users on behalf of a customer, etc.

The request intake module 208 provides the received request to the request enriching module 210. The request enriching module 210 enriches the request with customer criteria associated with the customer that transmitted the request. For example, the request enriching module 210 uses a unique identifier included in the request to identify the customer that transmitted the request. The request enriching module 210 communicates with the buyer criteria storage 216 to gather the customer criteria corresponding to the customer. The request enriching module 210 then appends some or all of the customer criteria to the request, resulting in an enriched request. The request enriching module 210 then provides the enriched request to the auction engine 212.

The auction engine 212 selects a routing provider 108 to deliver the message based on the customer criteria appended to the enriched message, as well as the bids provided by the routing providers 108 and the quality scores stored in the quality index.

The bid gatherer 302 communicates with the routing provider bid storage 218 to gather the bids provided by the routing providers 108. The bid gatherer 302 may gather all of the bids stored in the routing provider bid storage 218 or a subset of the bids stored in the routing provider bid storage 218. For example, the bid gatherer 302 may use an allowed list and/or blocked list included in the customer criteria to select a subset of the bids that are eligible for selection. As another example, the bid gatherer 302 may select a subset of the bids that fall within criteria specified by the customer criteria, such as the bids associated with a cost value that is below a maximum bid value and/or higher than minimum cost value defined by the customer criteria. As another example, the bid gathered 302 may select a subset of the bids that provide a level of service that is greater than a minimum level or service and/or lower than a maximum level of service defined by the customer criteria.

The bid gatherer 302 may also select a subset of bids based on a geographic region associated with the message request. For example, the recipient of the message may be in a specified geographic region. Accordingly, the bid gatherer 302 may select a subset of the bids that provide delivery in the given geographic region.

The quality index gatherer 304 gathers quality scores for the bids. For example, the quality index gatherer 304 communicates with the quality index storage 220 to gather the quality scores. The quality index gatherer 304 may gather the entire quality index or a subset of the quality scores included in the quality index. For example, the quality index gatherer 304 may gather a subset of the quality scores that correspond to the bids gathered by the bid gatherer 302.

The bid ranker 306 receives the enriched request generated by the request enriching module 210, the bids gathered by the bid gatherer 302 and the quality scores gathered by the quality index gatherer 304. The bid ranker 306 uses this provided input to rank each of the bids based on the customer criteria included in the enriched request. The bid ranker 306 calculates a ranking value for each bid based on a combination of the customer criteria, the quality scores and/or the cost values associated with the bids and then ranks the bids based on the resulting ranking values.

In some embodiments, the bid ranker 306 calculates the ranking value for each bid based on the quality score associated with the bid and the cost value of the bid. For example, the bid ranker 306 may calculate the ranking score by multiplying or adding the cost value to the quality score In other embodiments, however, the bid ranker 306 calculates the ranking value for each bid based on the quality score associated with the bid, the cost value of the bid, and the customer criteria. For example, bid ranker 306 may apply a weight to the quality scores and/or cost values based on the customer criteria and then calculate the ranking values based on the weighted quality scores and/or cost values. The bid ranker 306 may apply a weight to one or both of the cost value and quality score, resulting in a weighted cost value and/or weighted quality score. The bid ranker 306 then calculates the ranking value for each bid based on the weighted cost value and/or weighted quality score. For example, the bid ranker 306 may multiply the weighted cost value by the weighted quality score, resulting in the ranking value. As another example, the bid ranker 306 may multiply the weighted cost value by the quality score (e.g., quality score without a weight applied), resulting in the ranking value.

The bid ranker 306 ranks each of the bids based on the ranking values. For example, the bid ranker 306 ranks the bids from the bid with the highest ranking value to the bid with the lowest ranking value, or vice versa.

The routing provider selector 308 selects a bid for the message based on the ranking generated by the bid ranker 306. For example, the routing provider selector 308 selects the bid that is ranked the highest. The routing provider selector 308 also selects a final cost value for delivering the message via the selected bid. For example, the routing provider selector 308 may simply select the cost value associated with the selected bid as the final cost value. Alternatively, the routing provider selector 308 may select the cost value associated with another bid, such as the second highest ranked bid, as the final cost value, even though the second bid was not selected for delivering the message.

The routing provider selector 308 provides data identifying the selected bid to the output module 214. In turn, the output module 214 allocates the message to the routing provider 108 associated with the selected bid. For example, the output module 214 transmits the message to the corresponding routing provider 108, which then delivers the message to its intended recipient.

Figure 6:
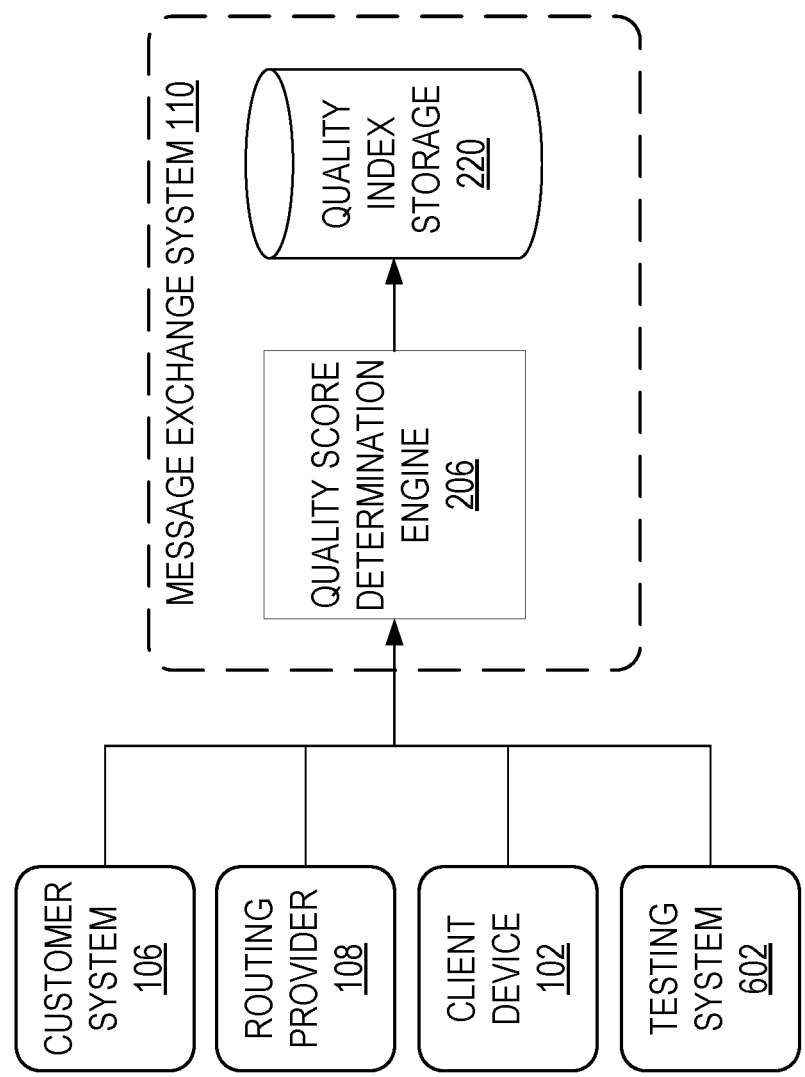
FIG. 6 is a block diagram of the message exchange system generating the quality index, according to some example embodiments.

FIG. 6 is a block diagram 600 of the message exchange system 110 generating the quality index, according to some example embodiments. As shown the message exchange system 110 includes a quality score determination engine 206 and a quality index storage 220. The quality score determination engine 206 generates and maintains a quality index that describes the quality of service provided by each routing provider 108. For example, the quality index includes individual quality scores determined for each routing provider 108, destination route provided by each routing provider, and/or each service level provided by each routing provider 108.

The quality score determination engine 206 calculates each quality score based on data received from customer systems 106, routing providers 108, client devices 102 and testing systems 602. Although only one customer system 106, routing provider 108, client device 102 and testing system 602 are shown in FIG. 6, this is just for ease of explanation and is not meant to be limiting. The quality score determination engine 206 may receive data from any number of customer systems 106, routing providers 108, client devices 102 and testing systems 602.

The data received from the customer systems 106, routing providers 108, client devices 102 and testing systems 602 includes feedback data and performance testing data for each routing provider 108. The feedback data is data describing the routing provider's 108 actual performance delivering messages that have been allocated to the routing provider 108 for delivery. For example, the feedback data includes data describing whether the routing provider 108 transmitted the messages to their intended recipients, whether the messages were successfully received by their intended recipients, whether the messages resulted in a specified action by the recipients, an amount of time that elapsed until the messages were transmitted by the routing provider, an amount of time that elapsed until the messages were received by the recipients, etc.

The quality score determination engine 206 can receive the performance feedback data from the customer systems 106, routing providers 108, and/or the client devices 102. For example, the customer systems 106 may generate conversion data by eliciting feedback and/or acknowledgements from the client device 102 to which the customer has sent message. The customer systems 106 may provide this conversion data to the quality score determination engine 206. As another example, the quality score determination engine 206 may receive similar conversion data generated by the routing providers 108. For example, the routing providers may maintain data describing when messages were transmitted, whether an acknowledgement was received from the recipient, whether a specified conversion was detected, etc.

The quality score determination engine 206 may also receive performance feedback data directly from the client devices 102. For example, the client devices 102 may transmit acknowledgement messages directly to the quality score determination engine 206 indicating that the client device 102 received a message. The client devices 102 may transmit the acknowledgement using an Application Programming Interface (API) command provided by the message exchange system 110.

In contrast to the performance feedback data, the performance testing data describes the tested performance of the routing providers 108. That is, the performance testing data describes performance of test or synthetic messages transmitted by the routing providers 108. For example, testing systems 602 run tests of the routing providers 108 networks during which test and/or synthetic messages are transmitted using various routes provided by the routing providers 108. The testing system 602 tracks performance of the test messages, such as whether the test messages were transmitted, received and/or resulted in a specified response, the elapsed time for the test messages to be transmitted and/or received, etc. The testing system 602 generates performance testing data based on the tracked performance of the tests and provides the generated performance testing data to the quality score determination engine 206.

The quality score determination engine 206 calculates a quality score for each routing provider 108, destination route provided by each routing provider 108, and/or service level provided by each routing provider 108 based on the feedback data and/or performance testing data associated with the routing provider 108. The resulting quality scores indicate the performance level of the routing provider 108, such as the likelihood that a message delivered by the routing provider 108, route provided by the routing provider 108, and/or service level provided by the routing provider 108 will successfully be received by its intended recipient.

The quality score determination engine 206 can a logistic regression model or collaborative filtering model to calculate the quality scores. For example, the model may be trained based on a variety of features, such as whether a message was or was not delivered, the time (e.g., day, hour, etc.) the message was sent, the routing provider that transmitted the message, the destination country, connectivity characteristics, pipeline stability, traffic volume, etc. Once trained, the resulting model outputs the quality score based on a specified set of input data. Accordingly, the quality score determination engine 206 may gather the appropriate input data for each routing provider 108, route provided by each routing provider 108, and/or level of service provided by each routing provider 108 and use the gathered data as input into the trained model to generate the quality score.

The quality score determination engine 206 writes each quality score to a quality index stored in the quality index storage 220. Each quality score in the quality index may be associated with a unique identifier identifying its corresponding routing provider 108, route, and/or service level. The quality score determination engine 206 may update the quality scores in the quality index periodically to reflect the current performance level of each routing provider 108 based on varying factors, such as time, network conditions, etc.

Figure 7:
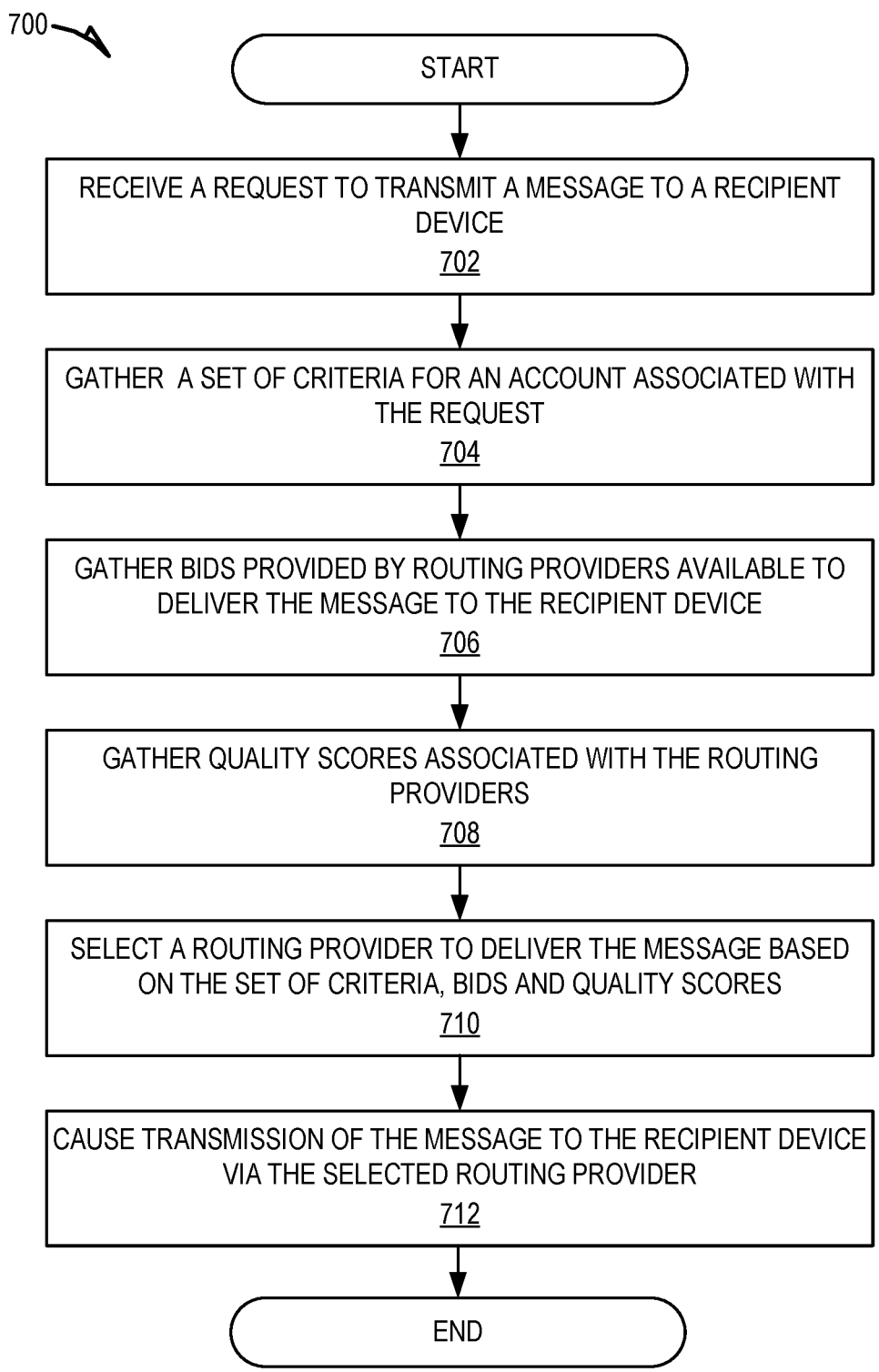
FIG. 7 is a flowchart showing a method for transmitting a message via a routing provider selected based on customer criteria, according to some example embodiments.

FIG. 7 is a flowchart showing a method 700 for transmitting a message via a routing provider 108 selected based on customer criteria, according to some example embodiments. The method 700 may be embodied in computer readable instructions for execution by one or more processors such that the operations of the method 700 may be performed in part or in whole by the message exchange system 110; accordingly, the method 700 is described below by way of example with reference thereto. However, it shall be appreciated that at least some of the operations of the method 700 may be deployed on various other hardware configurations and the method 700 is not intended to be limited to the message exchange system 110.

At operation 702, the request intake module 208 receives a request to transmit a message to a recipient device. For example, the request intake module 208 may receive the request from a customer system 106. The request may be transmitted as a result of a user utilizing the online functionality provided by the customer system 106. For example, a user may use a client device 102 to communicate with and utilize the functionality of the customer system 106, which may involve transmission of the message. For example, a user may request to login to an account, resulting in transmission of a message to provide two-factor authentication. As another example, a user may initiate transmitting a message to an agent of the customer or another user. Alternatively, the request may be transmitted by the customer system 106 to provide functionality that is not in direct response to a user use of an online service. For example, the request may be transmitted by the customer system 106 to provide promotional materials or updates to users.

The request may include data identifying the customer, data identifying the intended recipient, and/or a payload of the message. For example, the request may include a unique identifier assigned to the customer and/or the customer's account with the message exchange system 110. The request may also include an identifier for the recipient of the message, such as a phone number associated with a recipient client device 102, an account of the message exchange system 110 associated with the recipient, etc. The payload may include text, image, a rich media format of data and/or any combination of data formats but not limited to the above formats to be included in the message provided to the recipient.

At operation 704, the request enriching module 210 gathers a set of criteria for an account associated with the request. For example, the request enriching module 210 identifies the customer that transmitted the request based on the unique identifier or other data included in the request, and then searches the customer criteria storage 216 for the customer criteria associate with the identified customer. The request enriching module 210 appends at least a portion of the customer criteria to the received request, resulting in an enriched request. For example, the enriched request may be appended with data identify a minimum level of service, a maximum price the customer is willing to be charged per message, an allowed list and/or blocked list of routing providers 108, an importance of cost versus quality of service, etc. The request enriching module 210 may enrich the request with a subset of the customer criteria that is relevant to the message. For example, a customer may define varying customer criteria (e.g., maximum cost, minimum level or service, etc.) based on the type of message (e.g., two communication, password reset, etc.) and/or the geographic region associated with the message. Accordingly, the request enriching module 210 may identify the customer criteria that relates to the message based on the message type and/or geographic region, and then append the identified customer criteria to the request. The request enriching module 210 provides the enriched request to the auction engine 212.

At operation 706, the bid gatherer 302 gathers bids provided by routing providers 108 available to deliver the message to the recipient device. For example, the bid gatherer 302 communicates with the routing provider bid storage 218 to gather the bids provided by the routing providers 108. The bid gatherer 302 may gather all of the bids or a subset of the bids stored in the routing provider bid storage 218. For example, the bid gatherer 302 may use an allowed list and/or blocked list included in the customer criteria to select a subset of the bids that are eligible for selection. As another example, the bid gatherer 302 may select a subset of the bids that fall within criteria specified by the customer criteria, such as the bids associated with a cost value that is below a maximum bid value and/or higher than minimum cost value defined by the customer criteria. As another example, the bid gathered 302 may select a subset of the bids that provide a level of service that is greater than a minimum level or service and/or lower than a maximum level of service defined by the customer criteria.

The bid gatherer 302 may also select a subset of bids based on a geographic region associated with the message request. For example, the recipient of the message may be in a specified geographic region. Accordingly, the bid gatherer 302 may select a subset of the bids that provide delivery in the given geographic region.

At operation 708, the quality index gatherer 304 gathers quality scores associated with the routing providers 108. For example, the quality index gatherer 304 communicates with the quality index storage 220 to gather the quality scores. The quality index gatherer 304 may gather the entire quality index or a subset of the quality scores. For example, the quality index gatherer 304 may gather a subset of the quality scores that correspond to the bids gathered by the bid gatherer 302.

At operation 710, the auction engine 212 selects a routing provider 108 to deliver the message based on the set of criteria, bids and quality scores. For example, the auction engine 212 determines ranking values for each bid based on a combination of the set of criteria, bids and quality scores and then selects a routing provider 108 based on the ranking. Examples of selecting a routing provider 108 and determining the quality scores is described below in relation to FIGS. 8 and 9.

At operation 712, the output module 214 causes transmission of the message to the recipient device via the selected routing provider 108. The auction engine 212 provides data identifying the selected bid to the output module 214. The output module 214 allocates the message for delivery to the routing provider 108 associated with the selected bid. For example, the output module 214 transmits the message to the selected routing provider 108 with instructions to deliver the message to the intended recipient client device 102. The output module 214 may provide the routing provider with data identifying the specific bid selected by the message exchange system 110. This may provide the routing provider 108 with data regarding which route and/or service level to provide for delivering the message.

Figure 8:
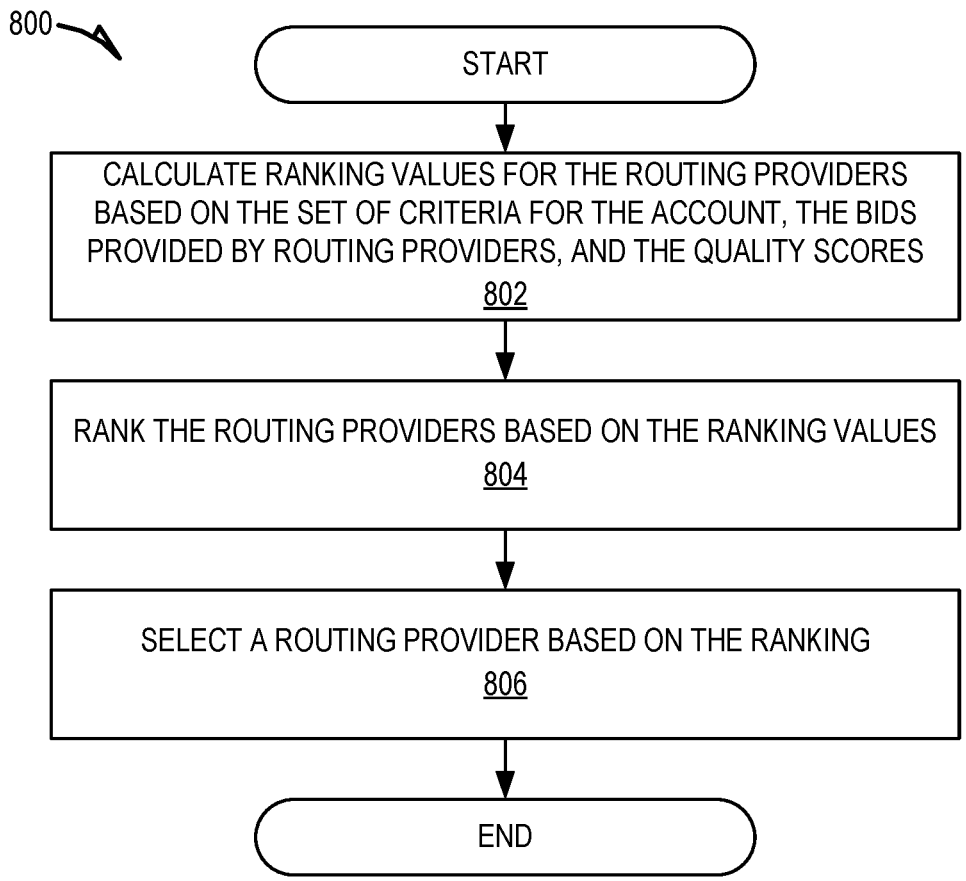
FIG. 8 is a flowchart showing a method for selecting a routing provider to deliver a message, according to some example embodiments.

FIG. 8 is a flowchart showing a method 800 for selecting a routing provider 108 to deliver a message, according to some example embodiments. The method 800 may be embodied in computer readable instructions for execution by one or more processors such that the operations of the method 800 may be performed in part or in whole by the message exchange system 110; accordingly, the method 800 is described below by way of example with reference thereto. However, it shall be appreciated that at least some of the operations of the method 800 may be deployed on various other hardware configurations and the method 800 is not intended to be limited to the message exchange system 110.

At operation 802, the bid ranker 306 calculates ranking values for the routing providers 108 based on the set of criteria for the account, the bids provided by the routing providers 108, and the quality scores. The bid ranker 306 calculates a ranking value for each bid/routing provider based on a combination of the customer criteria, the quality scores and/or the cost values associated with the bids. For example, in some embodiments, the bid ranker 306 calculates the ranking value for each bid based on only the quality score associated with the bid and the cost value of the bid.

For example, the bid ranker 306 may calculate the ranking score by multiplying or computing a function of the cost value and the quality score.

In other embodiments however, the bid ranker 306 calculates the ranking value for each bid based on the quality score associated with the bid, the cost value of the bid, and the customer criteria. For example, the bid ranker 306 may apply a weight to the quality scores and/or cost values based on the customer criteria and then calculate the ranking values based on the weighted quality scores and/or cost values. An example of calculates ranking values based on weighted quality scores is described below in relation to FIG. 9.

At operation 804, the bid ranker 306 ranks the routing providers 108 based on the ranking values. For example, the bid ranker 306 ranks the bids from the bid with the highest-ranking value to the bid with the lowest ranking value, or vice versa.

At operation 806, the routing provider selector 308 selects a routing provider 108 based on the ranking. For example, the routing provider selector 308 selects the bid that is ranked the highest. The routing provider selector 308 may also select a final cost value for delivering the message via the selected bid. For example, the routing provider selector 308 may select the cost value associated with the selected bid or the cost value associated with another bid, such as the second highest ranked bid. The routing provider selector 308 provides data identifying the selected bid to the output module 214.

Figure 9:
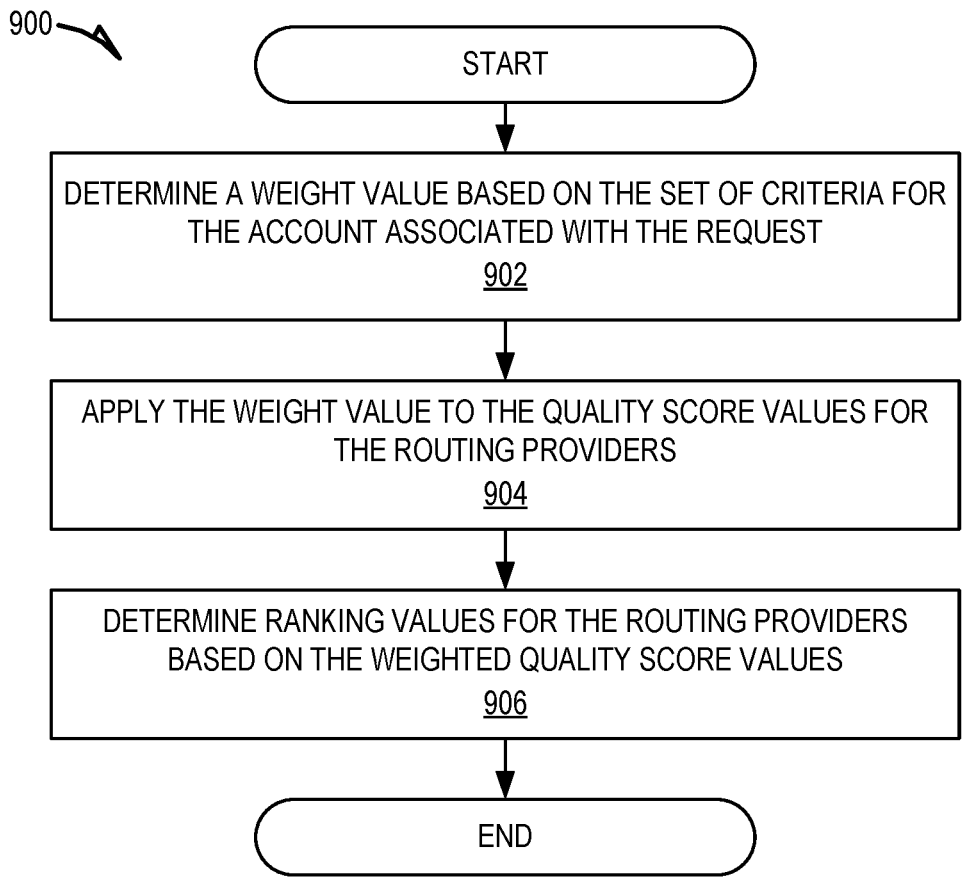
FIG. 9 is a flowchart showing a method for calculating a ranking value for a routing provider, according to some example embodiments.

FIG. 9 is a flowchart showing a method 900 for calculating a ranking value for a routing provider 108, according to some example embodiments. The method 900 may be embodied in computer readable instructions for execution by one or more processors such that the operations of the method 900 may be performed in part or in whole by the message exchange system 110; accordingly, the method 900 is described below by way of example with reference thereto. However, it shall be appreciated that at least some of the operations of the method 900 may be deployed on various other hardware configurations and the method 900 is not intended to be limited to the message exchange system 110.

At operation 902, the bid ranker 306 determines a weight value based on the set of criteria for the account associated with the request. The weight value can be determined based on a level of importance selected by the customer and indicated in the customer criteria. For example, the customer may select a level of importance indicating the customer's preference of using a routing provider 108 that provides high quality (e.g., a high likelihood of successfully delivering a message) to a routing provider 108 that offers a low cost. The weight value may be a multiplier indicating the level of importance designated by the customer. For example, the weight value may be a value less than 1 to indicate that the customer places a lower level of importance on the quality provided by the routing providers 108. Alternatively, the weight value may be a value greater than 1 to indicate that the customer places a higher level of importance on the quality provided by the routing providers 108.

At operation 904, the bid ranker 306 applies the weight value to the quality score values for the routing providers 108. For example, the bid ranker 306 may multiply the quality score for each routing provider 108 by the weight value.

At operation 906, the bid ranker 306 determines the ranking values for the routing providers 108 based on the weighted quality score values. For example, the bid ranker 306 may calculate the ranking score for each routing provider 108 by multiplying or adding the cost value for the routing provider 108 to the weighted quality score for each routing provider 108.

Software Architecture

Figure 10:
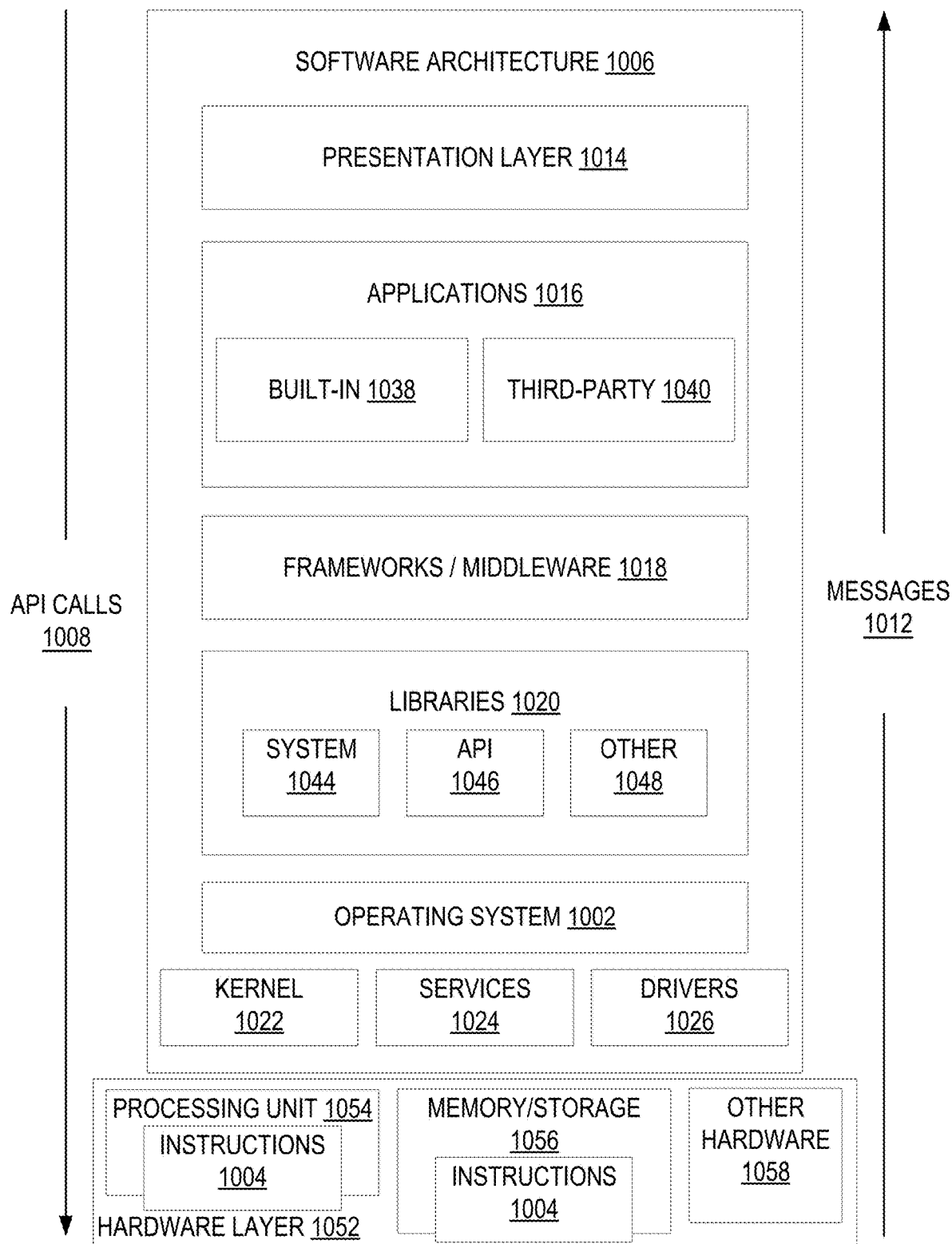
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating an example software architecture 1006, which may be used in conjunction with various hardware architectures herein described. FIG. 10 is a non-limiting example of a software architecture 1006 and it will be appreciated that many other architectures may be implemented to facilitate the functionality described herein. The software architecture 1006 may execute on hardware such as machine 1100 of FIG. 11 that includes, among other things, processors 1104, memory 1114, and (input/output) I/O components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components, and so forth described herein. The hardware layer 1052 also includes memory and/or storage modules 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke application programming interface (API) calls 1008 through the software stack and receive a response such as messages 1012 in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphical user interface (GUI) functions, high-level resource management, high-level location services, and so forth. The frameworks/middleware 1018 may provide a broad spectrum of other APIs that may be used by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024, and/or drivers 1026), libraries 1020, and frameworks/middleware 1018 to create UIs to interact with users of the system. Alternatively, or additionally, in some systems, interactions with a user may occur through a presentation layer, such as presentation layer 1014. In these systems, the application/component "logic" can be separated from the aspects of the application/component that interact with a user.

Figure 11:
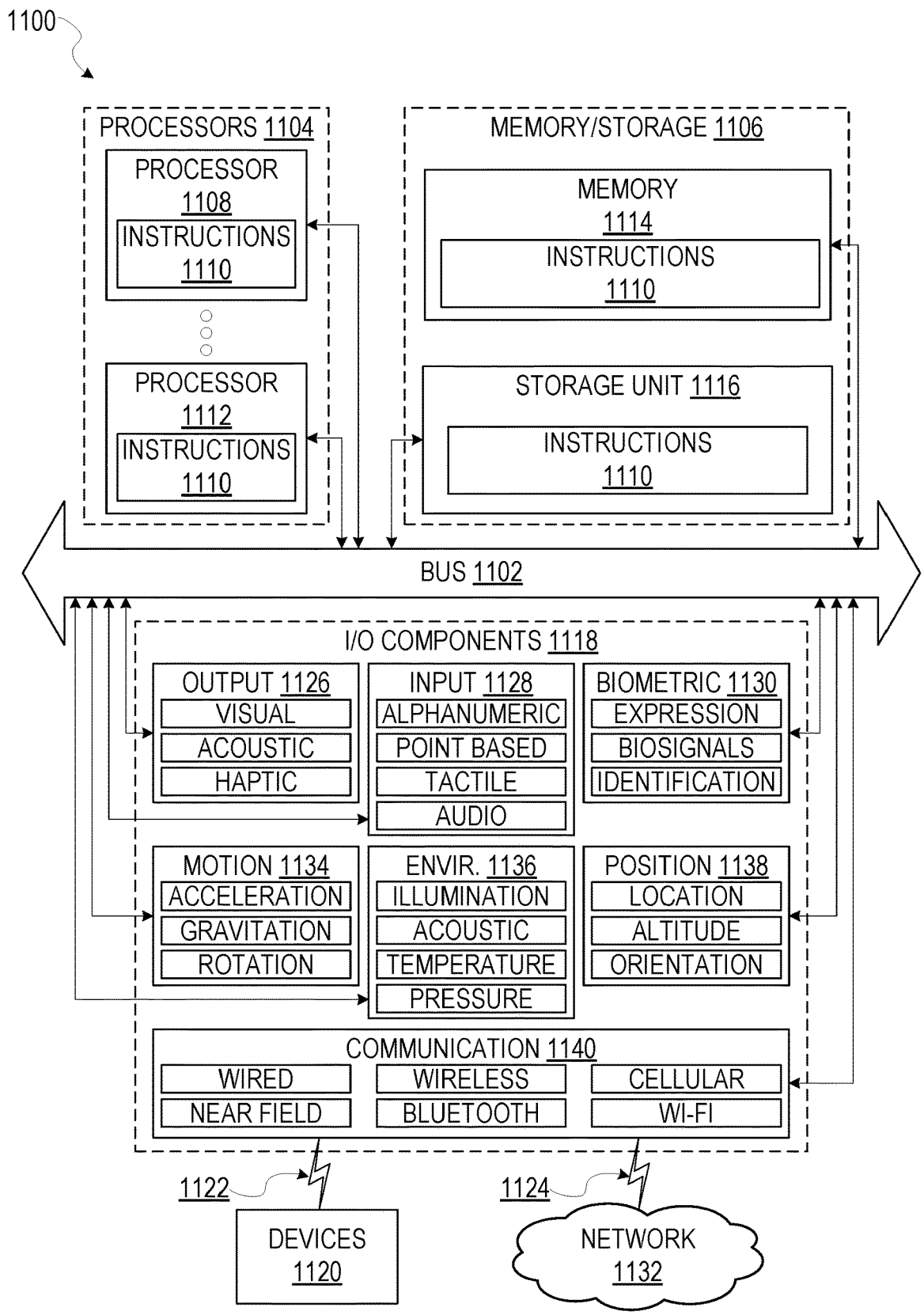
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions 1004 from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1100 capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environmental components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1124 and coupling 1122, respectively. For example, the communication components 1140 may include a network interface component or other suitable device to interface with the network 1132. In further examples, communication components 1140 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1110 for execution by the machine 1100, and includes digital or analog communications signals or other intangible medium to facilitate communication of such instructions 1110. Instructions 1110 may be transmitted or received over the network 1132 using a transmission medium via a network interface device and using any one of a number of well-known transfer protocols.

"CLIENT DEVICE" in this context refers to any machine 1100 that interfaces to a communications network 1132 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1132.

"COMMUNICATIONS NETWORK" in this context refers to one or more portions of a network 1132 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1132 or a portion of a network 1132 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1110 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1110. The term "machine-readable medium" shall also be taken to include any medium, or combination of multiple media, that is capable of storing instructions 1110 (e.g., code) for execution by a machine 1100, such that the instructions 1110, when executed by one or more processors 1104 of the machine 1100, cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1104) may be configured by software (e.g., an application 1016 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1104 or other programmable processor 1104. Once configured by such software, hardware components become specific machines 1100 (or specific components of a machine 1100) uniquely tailored to perform the configured functions and are no longer general-purpose processors 1104. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1104 configured by software to become a special-purpose processor, the general-purpose processor 1104 may be configured as respectively different special-purpose processors (e.g., comprising different hardware components) at different times. Software accordingly configures a particular processor or processors 1104, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1102) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1104 that are temporarily configured (e.g., by software) or permanently configured to perform the relevant operations. Whether temporarily or permanently configured, such processors 1104 may constitute processor-implemented components that operate to perform one or more operations or functions described herein. As used herein, "processor-implemented component" refers to a hardware component implemented using one or more processors 1104. Similarly, the methods described herein may be at least partially processor-implemented, with a particular processor or processors 1104 being an example of hardware. For example, at least some of the operations of a method may be performed by one or more processors 1104 or processor-implemented components. Moreover, the one or more processors 1104 may also operate to support performance of the relevant operations in a "cloud computing" environment or as a "software as a service" (SaaS). For example, at least some of the operations may be performed by a group of computers (as examples of machines 1100 including processors 1104), with these operations being accessible via a network 1132 (e.g., the Internet) and via one or more appropriate interfaces (e.g., an API). The performance of certain of the operations may be distributed among the processors 1104, not only residing within a single machine 1100, but deployed across a number of machines 1100. In some example embodiments, the processors 1104 or processor-implemented components may be located in a single geographic location (e.g., within a home environment, an office environment, or a server farm). In other example embodiments, the processors 1104 or processor-implemented components may be distributed across a number of geographic locations.

"PROCESSOR" in this context refers to any circuit or virtual circuit (a physical circuit emulated by logic executing on an actual processor 1104) that manipulates data values according to control signals (e.g., "commands," "op codes," "machine code," etc.) and which produces corresponding output signals that are applied to operate a machine 1100. A processor 1104 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1104 may further be a multi-core processor having two or more independent processors 1104 (sometimes referred to as "cores") that may execute instructions 1110 contemporaneously.

What is claimed is:

1. A method comprising:

receiving, from a first client device associated with a client system and by a message exchange system via a communication network, a first client request to update a first set of criteria identifying client preferences for text message delivery, the first client request identifying a first cost preference for a first text message type of a plurality of text message types and a second cost preference for a second text message type of the plurality of text message types, wherein a text message type corresponds to a classification of text messages based on content of a text message;

storing an identifier of the first set of criteria at a data store;

subsequent to receiving the first client request to update the first set of criteria, receiving, from a second client device associated with the client system and by the message exchange system, a second client request to transmit a first text message to a recipient device, the second client request associated with a first account; and in response to the receiving of the second client request:

identifying, by the message exchange system, the first set of criteria identifying the client preferences for text message delivery and stored at the data store based on a unique identifier associated with the client system;

gathering, by the message exchange system, a first bid provided by a first routing provider and a second bid provided by a second routing provider, the first bid indicating a first cost value for the first routing provider to deliver the first text message to the recipient device, and the second bid indicating a second cost value for the second routing provider to deliver the first text message to the recipient device;

determining, by the message exchange system, a first quality score indicating a likelihood that the first text message delivered by the first routing provider will be successfully delivered to the recipient device, wherein the first quality score is determined using first feedback data describing an actual performance of the first routing provider in delivering first previous text messages, wherein the first feedback data identifies (i) whether the first previous text messages were successfully received by recipient devices, and (ii) whether the first previous text messages resulted in a specified action by recipients associated with the recipient devices;

determining, by the message exchange system, a second quality score indicating a likelihood that the first text message delivered by the second routing provider will be successfully delivered to the recipient device, wherein the second quality score is determined using second feedback data describing an actual performance of the second routing provider in delivering second previous text messages;

selecting, by the message exchange system, the first routing provider to deliver the first text message to the recipient device based on the first bid, the second bid, the first quality score, the second quality score, and one of the first cost preference for the first text message type or the second cost preference for the second text message type identified in the first set of criteria; and causing, by the message exchange system, the first text message to be transmitted to the recipient device via the first routing provider.

2. The method of claim 1, wherein selecting the first routing provider to deliver the first text message comprises:

calculating a first ranking value for the first bid based on the first set of criteria, the first cost value, and the first quality score;

calculating a second ranking value for the second bid based on the first set of criteria, the second cost value, and the second quality score;

ranking the first bid and the second bid based on the first ranking value and the second ranking value; and selecting the first routing provider based on the ranking.

3. The method of claim 2, wherein calculating the first ranking value comprises:

determining a first weight value based on the first set of criteria;

applying the first weight value to the first quality score, yielding a first weighted quality score; and determining the first ranking value based on the first cost value and the first weighted quality score.

4. The method of claim 3, wherein calculating the second ranking value comprises:

applying the first weight value to the second quality score, yielding a second weighted quality score; and determining the second ranking value based on the second cost value and the second weighted quality score.

5. The method of claim 1, the method further comprising:

receiving a third client request to transmit a second text message to a second recipient device, the third client request associated with a second account;

gathering a second set of criteria associated with the second account;

gathering the first bid provided by the first routing provider and the second bid provided by the second routing provider;

gathering a first updated quality score indicating an updated likelihood that the second text message delivered by the first routing provider will be successfully delivered to the second recipient device, and a second updated quality score indicating an updated likelihood that the second text message delivered by the second routing provider will be successfully delivered to the second recipient device;

selecting the second routing provider to deliver the second text message to the second recipient device based on the second set of criteria associated with the second account, the first bid, the second bid, the first updated quality score and the second updated quality score; and causing the second text message to be transmitted to the second recipient device via the second routing provider.

6. The method of claim 1, wherein the first set of criteria identifies a maximum cost value.

7. The method of claim 6, wherein the gathering of the first bid provided by the first routing provider and the gathering of the second bid provided by the second routing provider comprise:

determining that the first cost value and the second cost value do not exceed the maximum cost value identified by the first set of criteria.

8. The method of claim 7, wherein the gathering the first bid provided by the first routing provider and the gathering of the second bid provided by the second routing provider further comprise:
based on determining that a third cost value associated with a third bid exceeds the maximum cost value identified by the first set of criteria, excluding the third bid from a set of bids gathered for potential selection to deliver the first text message, the set of bids gathered for potential selection to deliver the first text message including the first bid and the second bid.

9. The method of claim 1, wherein the first set of criteria identifies a minimum level of service.

10. The method of claim 9, wherein the gathering of the first bid provided by the first routing provider and the gathering of the second bid provided by the second routing provider comprise:
determining that a first level of service associated with the first bid and a second level of service associated with the second bid meet or exceed the minimum level of service identified by the first set of criteria.

11. The method of claim 1, wherein the first feedback data further identifies (iii) whether the first routing provider transmitted the first previous text messages to the recipient devices.

12. The method of claim 1, further comprising:
providing, to the first client device, a user interface for providing the first set of criteria identifying the client preferences for text message delivery; and
receiving, from the first client device via the user interface, an identifier of the first cost preference for the first text message type and the second cost preference for the second text message type.

13. A message exchange system comprising:
one or more computer processors; and
one or more computer-readable mediums storing instructions that, when executed by the one or more computer processors, cause the message exchange system to perform operations comprising:
receiving, from a first client device associated with a client system and by a text message exchange system via a communication network, a first client request to update a first set of criteria identifying client preferences for text message delivery, the first client request identifying a first cost preference for a first text message type of a plurality of text message types and a second cost preference for a second text message type of the plurality of text message types, wherein a text message type corresponds to a classification of text messages based on content of a text message;
storing an identifier of the first set of criteria at a data store;
subsequent to receiving the first client request to update the first set of criteria, receiving, from a second client device associated with the client system and by the message exchange system, a second client request to transmit a first text message to a recipient device, the second client request associated with a first account; and
in response to the receiving of the second client request:
identifying the first set of criteria identifying the client preferences for text message delivery and that are stored at the data store based on a unique identifier associated with the client system;
gathering a first bid provided by a first routing provider and a second bid provided by a second routing provider, the first bid indicating a first cost value for the first routing provider to deliver the first text message to the recipient device, and the second bid indicating a second cost value for the second routing provider to deliver the first text message to the recipient device;
determining a first quality score indicating a likelihood that the first text message delivered by the first routing provider will be successfully delivered to the recipient device, wherein the first quality score is determined using first feedback data describing an actual performance of the first routing provider in delivering first previous text messages, wherein the first feedback data identifies (i) whether the first previous text messages were successfully received by recipient devices, and (ii) whether the first previous text messages resulted in a specified action by recipients associated with the recipient devices;
determining a second quality score indicating a likelihood that the first text message delivered by the second routing provider will be successfully delivered to the recipient device, and wherein the second quality score is determined using second feedback data describing an actual performance of the second routing provider in delivering second previous text messages;
selecting the first routing provider to deliver the first text message to the recipient device based on the first bid, the second bid, the first quality score, the second quality score, and one of the first cost preference for the first text message type or the second cost preference for the second text message type identified in the first set of criteria; and
causing the first text message to be transmitted to the recipient device via the first routing provider.

14. The system of claim 13, wherein selecting the first routing provider to deliver the first text message comprises:
calculating a first ranking value for the first bid based on the first set of criteria, the first cost value, and the first quality score;
calculating a second ranking value for the second bid based on the first set of criteria, the second cost value, and the second quality score;
ranking the first bid and the second bid based on the first ranking value and the second ranking value; and
selecting the first routing provider based on the ranking.

15. The system of claim 14, wherein calculating the first ranking value comprises:
determining a first weight value based on the first set of criteria;
applying the first weight value to the first quality score, yielding a first weighted quality score; and
determining the first ranking value based on the first cost value and the first weighted quality score.

16. The system of claim 15, wherein calculating the second ranking value comprises:
applying the first weight value to the second quality score, yielding a second weighted quality score; and
determining the second ranking value based on the second cost value and the second weighted quality score.

17. The system of claim 13, the operations further comprising:
receiving a third client request to transmit a second text message to a second recipient device, the third client request associated with a second account;
gathering a second set of criteria associated with the second account;

gathering the first bid provided by the first routing provider and the second bid provided by the second routing provider;

gathering a first updated quality score indicating an updated likelihood that the second text message delivered by the first routing provider will be successfully delivered to the second recipient device, and a second updated quality score indicating an updated likelihood that the second text message delivered by the second routing provider will be successfully delivered to the second recipient device;

selecting the second routing provider to deliver the second text message to the second recipient device based on the second set of criteria associated with the second account, the first bid, the second bid, the first updated quality score and the second updated quality score; and causing the second text message to be transmitted to the second recipient device via the second routing provider.

18. The system of claim 17, wherein the gathering of the first bid provided by the first routing provider and the gathering of the second bid provided by the second routing provider comprise:

determining that a first level of service associated with the first bid and a second level of service associated with the second bid meet or exceed a minimum level of service identified by the first set of criteria.

19. The system of claim 13, wherein the first set of criteria identifies a maximum cost value.

20. The system of claim 19, wherein the gathering the first bid provided by the first routing provider and the gathering of the second bid provided by the second routing provider comprise:

determining that the first cost value and the second cost value do not exceed the maximum cost value identified by the first set of criteria.

21. The system of claim 20, wherein the gathering of the first bid provided by the first routing provider and the gathering of the second bid provided by the second routing provider further comprise:

based on determining that a third cost value associated with a third bid exceeds the maximum cost value identified by the first set of criteria, excluding the third bid from a set of bids gathered for potential selection to deliver the first text message, the set of bids gathered for potential selection to deliver the first text message including the first bid and the second bid.

22. A non-transitory computer-readable medium storing instructions that, when executed by one or more computer processors of one or more computing devices of a message exchange system, cause the one or more computing devices to perform operations comprising:

receiving, from a first client device associated with a client system and by the message exchange system via a communication network, a first client request to update a first set of criteria identifying client preferences for text message delivery, the first client request identifying a first cost preference for a first text message type of a plurality of text message types and a second cost preference for a second text message type of the plurality of text message types, wherein a text message type corresponds to a classification of text messages based on content of a text message;

storing an identifier of the first set of criteria at a data store;

subsequent to receiving the first client request to update the first set of criteria, receiving, from a second client device associated with the client system and by the message exchange system, a second client request to transmit a first text message to a recipient device, the second client request associated with a first account; and in response to the receiving of the second client request;

identifying the first set of criteria identifying the client preferences for text message delivery and that are stored at the data store based on a unique identifier associated with the client system;

gathering a first bid provided by a first routing provider and a second bid provided by a second routing provider, the first bid indicating a first cost value for the first routing provider to deliver the first text message to the recipient device, and the second bid indicating a second cost value for the second routing provider to deliver the first text message to the recipient device;

determining a first quality score indicating a likelihood that the first text message delivered by the first routing provider will be successfully delivered to the recipient device, wherein the first quality score is determined using first feedback data describing an actual performance of the first routing provider in delivering first previous text messages, wherein the first feedback data identifies (i) whether the first previous text messages were successfully received by recipient devices, and (ii) whether the first previous text messages resulted in a specified action by recipients associated with the recipient devices;

determining a second quality score indicating a likelihood that the first text message delivered by the first routing provider will be successfully delivered to the recipient device, wherein the second quality score is determined using second feedback data describing an actual performance of the second routing provider in delivering second previous text messages;

selecting the first routing provider to deliver the first text message to the recipient device based on the first bid, the second bid, the first quality score, the second quality score and one of the first cost preference for the first text message type or the second cost preference for the second text message type identified in the first set of criteria; and causing the first text message to be transmitted to the recipient device via the first routing provider.

* * * * *